US008881310B2

(12) United States Patent
Hajj et al.

(10) Patent No.: US 8,881,310 B2
(45) Date of Patent: Nov. 4, 2014

(54) REMOTELY INITIATING LOST MODE ON A COMPUTING DEVICE

(75) Inventors: Usama Mikael Hajj, San Francisco, CA (US); Megan M. Frost, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/607,756

(22) Filed: Sep. 9, 2012

(65) Prior Publication Data

US 2013/0326642 A1    Dec. 5, 2013

Related U.S. Application Data

(63) Continuation-in-part of application No. 13/488,438, filed on Jun. 4, 2012.

(60) Provisional application No. 61/657,855, filed on Jun. 10, 2012.

(51) Int. Cl.
G06F 1/26 (2006.01)

(52) U.S. Cl.
USPC ............. 726/34; 713/193; 713/168; 713/300; 726/1; 726/35; 455/567

(58) Field of Classification Search
CPC .......... G06F 21/88; G06F 21/70; G06F 21/00
USPC ..................... 726/1, 34–35; 713/300; 455/420
See application file for complete search history.

(56) References Cited

U.S. PATENT DOCUMENTS

| 6,662,023 B1 | 12/2003 | Helle |
| 6,771,954 B1 | 8/2004 | Yoneyama et al. |
| 7,054,594 B2 | 5/2006 | Bloch et al. |
| 8,361,166 B2 | 1/2013 | Bhansali et al. |

(Continued)

FOREIGN PATENT DOCUMENTS

| JP | 11331366 | 11/1999 |
| JP | 2001230858 | 8/2001 |

(Continued)

OTHER PUBLICATIONS

S. Sarkar, Phone Standby Time, Sep. 2001, IEEE, vol. 50, pp. 1240-1249.*

(Continued)

*Primary Examiner* — Shin-Hon Chen
*Assistant Examiner* — Viral Lakhia
(74) *Attorney, Agent, or Firm* — Fish & Richardson P.C.

(57) ABSTRACT

Systems, methods, and non-transitory computer-readable storage media are provided for remotely initiating lost mode on a computing device. A request that lost mode be initiated can include a message and contact information provided by the requesting user. Once authenticated, a command to initiate lost mode is sent to the lost device. Initiating lost mode includes locking the lost device and suppressing select functionality. The message and contact information are displayed and the lost device is enabled to contact the requesting user using the contact information. The lost device can also collect and transmit location data to the requesting user. The location data can be presented on a map indicating the lost devices location and the time the lost device was at the location. The location data can be scheduled to be resent to the user based on numerous factors such as a set schedule, rules or heuristic.

20 Claims, 20 Drawing Sheets

(56) References Cited

U.S. PATENT DOCUMENTS

| | | | |
|---|---|---|---|
| 8,395,968 B2 | 3/2013 | Vartanian et al. | |
| 8,427,305 B2 | 4/2013 | Madsen et al. | |
| 8,538,458 B2 | 9/2013 | Haney | |
| 8,542,833 B2* | 9/2013 | Devol et al. | 380/259 |
| 8,548,499 B2 | 10/2013 | Ortiz et al. | |
| 8,565,820 B2* | 10/2013 | Riemer et al. | 455/557 |
| 8,600,405 B2 | 12/2013 | Madsen et al. | |
| 8,627,075 B2* | 1/2014 | Ikeda et al. | 713/168 |
| 8,647,768 B2 | 2/2014 | Sheem et al. | |
| 8,667,306 B2* | 3/2014 | Brown et al. | 713/193 |
| 8,676,273 B1* | 3/2014 | Fujisaki | 455/567 |
| 2003/0074577 A1* | 4/2003 | Bean et al. | 713/200 |
| 2008/0133938 A1* | 6/2008 | Kocher et al. | 713/193 |
| 2009/0253408 A1 | 10/2009 | Fitzgerald et al. | |
| 2010/0234060 A1* | 9/2010 | Beamish | 455/522 |
| 2010/0265131 A1* | 10/2010 | Fabius | 342/357.54 |
| 2010/0273452 A1 | 10/2010 | Rajan et al. | |
| 2011/0072520 A1 | 3/2011 | Bhansali et al. | |
| 2011/0185202 A1* | 7/2011 | Black et al. | 713/320 |
| 2012/0025978 A1 | 2/2012 | Ferren et al. | |
| 2012/0210389 A1* | 8/2012 | Brown et al. | 726/1 |
| 2012/0231811 A1 | 9/2012 | Zohar | |
| 2012/0324252 A1* | 12/2012 | Sarker | 713/300 |
| 2013/0090110 A1* | 4/2013 | Cloonan et al. | 455/420 |
| 2013/0326643 A1 | 12/2013 | Pai et al. | |

FOREIGN PATENT DOCUMENTS

| | | |
|---|---|---|
| JP | 2002218048 | 8/2002 |
| JP | 2003224886 | 8/2003 |
| JP | 2004356685 | 12/2004 |
| JP | 2005142875 | 6/2005 |
| JP | 2007306056 | 11/2007 |
| JP | 2009124188 | 6/2009 |

OTHER PUBLICATIONS

Extended European Search Report, dated Jan. 27, 2014, corresponding to European Application No. EP 13170175, 9 pages.

* cited by examiner

REMOTELY INITIATING LOST MODE ON A COMPUTING DEVICE

CROSS REFERENCE TO RELATED APPLICATIONS

This application is a continuation-in-part (CIP) of U.S. patent application Ser. No. 13/488,438, filed on Jun. 4, 2012; this application also claims the benefit of U.S. Provisional Patent Application No. 61/657,855, filed on Jun. 10, 2012, entitled "REMOTELY INITIATING LOST MODE ON A COMPUTING DEVICE"; both of which are hereby expressly incorporated herein by reference in their entireties.

BACKGROUND

1. Technical Field

The present disclosure relates to computing devices and, more specifically, to remotely initiating a lost mode on a computing device.

2. Introduction

Modern advances in computing devices have resulted in smaller, more powerful and wirelessly networked computing devices that can be easily carried by users at all times. As a result, these devices are relied on greatly by their owners and often are trusted to carry their owner's personal and sensitive information. Consequently, the great power, portability and convenience of these devices must be balanced against the potential for substantial financial damage to the owner in the event that a device becomes lost or stolen.

Naturally, theft of such devices has increased as thieves are attracted to the high price and high demand for such computing devices as well as the possibility of stealing personal information of the owner of the computing device. The high price and demand of a computing device can also tempt a non-thief that finds a lost computing device to keep the device rather than search for its rightful owner. Alternatively, a person that finds a lost device and intends to return it may find it difficult to locate the owner.

Current systems attempt to address these problems by providing the location of the device to an owner of a lost device by sending GPS or other locational tracking information to a secure website to which the owner may login. However, these types of systems do not help a person that finds the lost device return it to its owner. Other systems allow the lost device to be locked to deter theft. Although effective, the lock also makes it even more difficult for a person that finds the device to determine is the identity of the owner of the device because the information on the device cannot be accessed. Leaving the device unlocked increases the likelihood that the identity of the owner can be ascertained, however it also increases the likelihood that the device will not be returned and leaves personal or sensitive data stored on the lost device unprotected. Accordingly, there is a need for an improved system for locating a lost computing device that allows the owner of the computing device to protect the personal or sensitive data on the computing device while also making it easy for a person that finds the computing device to return the computing device to its owner.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for remotely initiating lost mode on a computing device. A requesting user can request that lost mode be initiated on a lost computing device. The request can be made on a requesting device in network communication with a server configured to communicate with the lost device. The request can include request data such as a message, contact information and password. The request data can be provided by the requesting user when requesting that lost mode be initiated on the lost device. A requesting user can be required to enter authenticating information to ensure that the requesting user is authorized to request that lost mode be initiated on the lost device.

Upon a request being made by a requesting user and the requesting user being authenticated, the server can be configured to send a command, including the request data, to the lost device to initiate lost mode on the lost device. Initiating lost mode can include locking the lost device and suppressing select functionality of the lost device so that the functionality of the lost device as well as data and applications stored on the lost device cannot be accessed by an unauthorized user.

Further, the ability to turn off the lost device can be suppressed. In some embodiments, the lost device can be configured to act as though it is powering down upon receiving an input command to power off the lost device, but in actuality the device remains running, thus misleading a potential thief about the status of the lost device.

Additionally, the message and contact information provided by the requesting user can be displayed on the user device to alert an honest person who finds the lost device as to how to contact the owner. A user interface element, such as a button, can also be presented and configured to enable the lost device to contact the requesting user by using the provided contact information. For example, a lost device such as a smart phone can be enabled to make an outbound call to a phone number provided by a requesting user as their contact information, while outbound calls to all other numbers are restricted. A person who finds the phone can thus easily contact the requesting user while all other functionality of the lost device is suppressed, and data stored thereon are protected.

In some embodiments, the device can be silently locked so that a potential thief is not alerted that lost mode has been initiated on the lost device. This can include presenting the lost device as being locked without presenting a message or contact information. In some embodiments, silently locking the device can include presenting the lost device as being in a powered off or inoperative state, rather than locked.

When lost mode is initiated, the lost device can also be configured to collect and transmit location data identifying the location of the lost device to the requesting user. The location data can be presented on a map indicating the location of the lost device as well as the time that the lost device was at the displayed location. Further status data, such as the remaining battery life of the lost device or whether lost mode has been initiated on the lost device can also be transmitted with the location data. The location data can be scheduled to be transmitted to the user based on numerous factors such as a set schedule, rules or heuristics.

If the lost device is unavailable when the requesting user requests that lost mode be initiated on the lost device, the server can keep checking the status of the lost device until the lost device is available and then send the command for lost mode to be initiated on the lost device. Further, a message alerting the requesting user that the lost device is available and that lost mode has been initiated can be sent to the requesting user either by the server or by the lost device.

In some embodiments, a message can be sent to the requesting user upon a determination that the lost device has been "found." Upon lost mode being initiated on the lost device, the lost device can be configured to send a notification to the requesting user upon a status change occurring which indicates that the lost device is in the possession of another person. For example, the status change can occur upon the location of the lost device changing or an input on the lost device being engaged.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
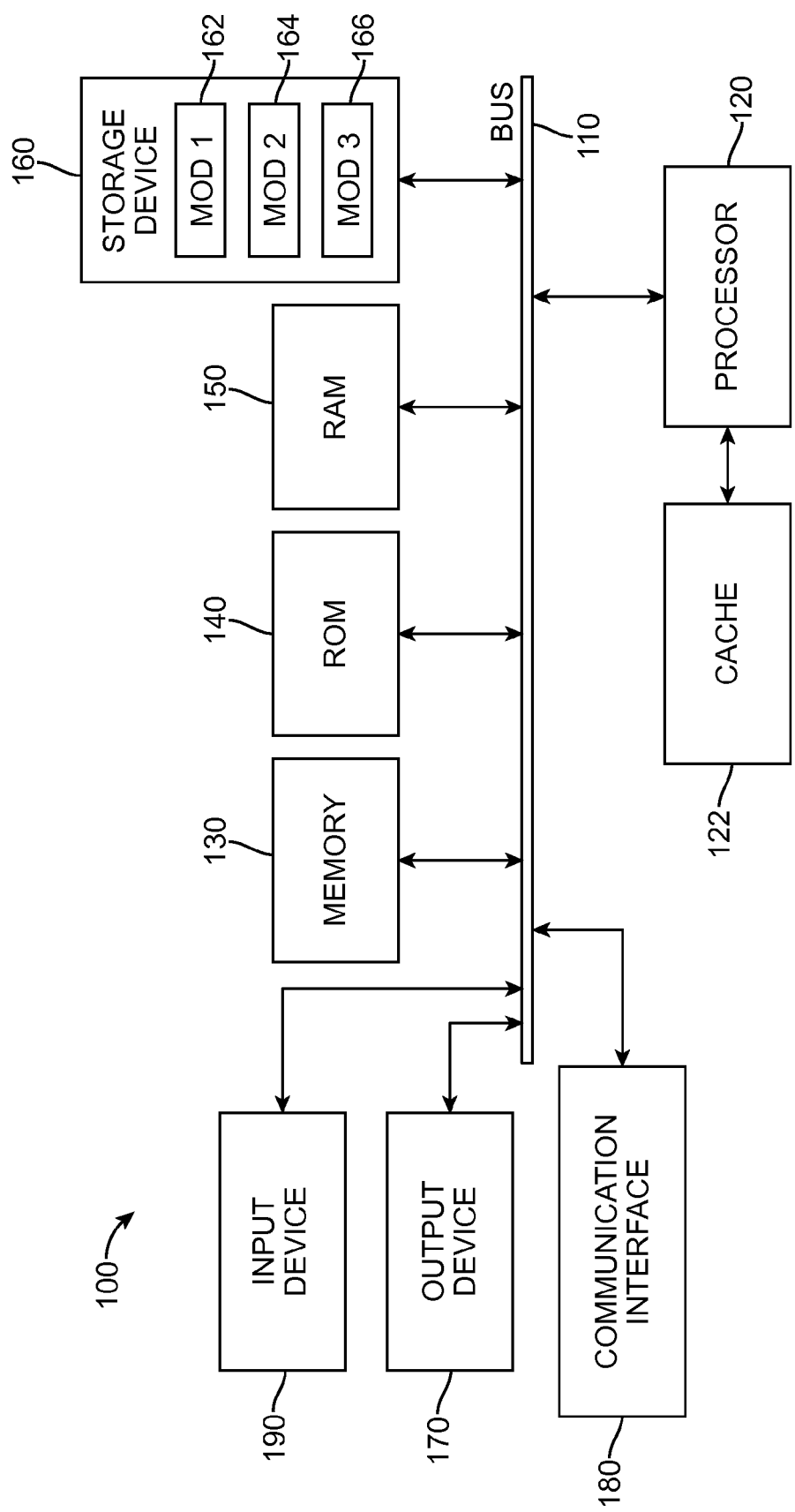
FIG. 1 illustrates an exemplary system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, output device 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs a storage device 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
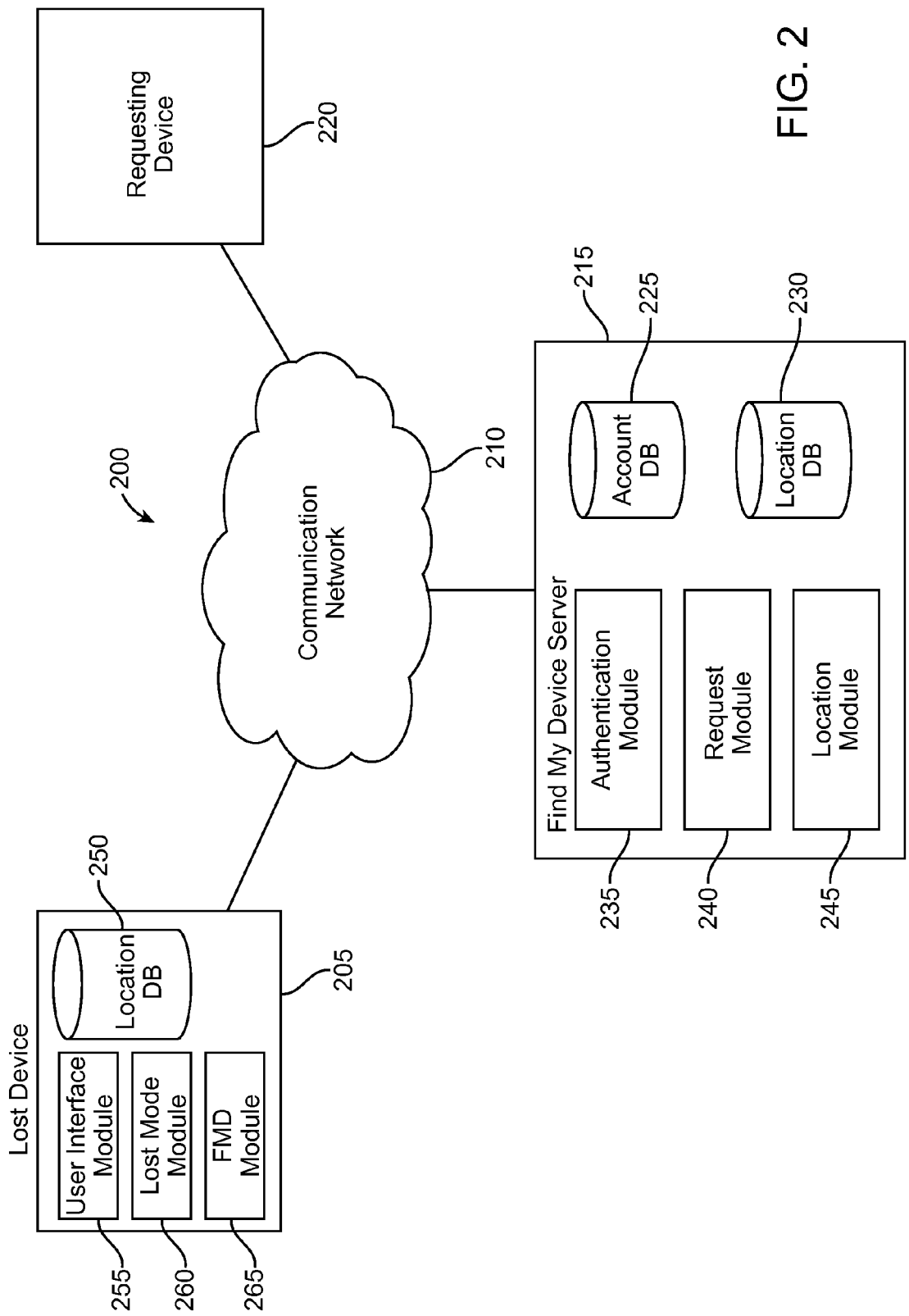
FIG. 2 illustrates an exemplary embodiment of a general purpose computing environment wherein a user can remotely initiate lost mode on a user device.

Having disclosed some components of a computing system, the disclosure now turns to FIG. 2, which illustrates a general purpose computing environment 200 wherein a user can remotely initiate lost mode on a user device. As illustrated, multiple computing devices can be connected to a communication network and be configured to communicate with each other through use of the communication network. The communication network 210 can be any type of network, including a local area network ("LAN"), such as an intranet, a wide area network ("WAN"), such as the internet, or any combination thereof. Further, the communication network 210 can be a public network, a private network, or a combination thereof. The communication network can also be implemented using any type or types of physical media, including wired communication paths and wireless communication paths associated with one or more service providers. Additionally, the communication network 210 can be configured to support the transmission of messages formatted using a variety of protocols.

Multiple computing devices can be connected to the communication network. A computing device can be any type of general computing device capable of network communication with other computing devices. For example, the computing device can be a personal computing device such as a desktop or workstation, a business server, or a portable computing device, such as a laptop, smart phone, or a post-pc device. The computing device can include some or all of the features, components, and peripherals of computing device 100 of FIG. 1. To facilitate communication with other computing devices, the computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As illustrated in FIG. 2, the exemplary system includes three computing devices in network communication with each other: a lost user device 205, a Find My Device (FMD) server 215 and a requesting user device 220. The system illustrated in FIG. 2 can be configured to remotely initiate lost mode on the lost user device 205. The requesting user device 220 can be configured to communicate with the FMD server 215 to create a request to initiate lost mode on the lost device 205.

The FMD server 215 can be configured to receive a request to initiate lost mode on the lost user device 205 and to send a command to the lost user device 205 to initiate lost mode. As illustrated, the FMD server 215 can contain a number of components. The components can include one or more databases for storing data relevant to the operation of the FMD server 215, e.g. an account database 225 and a location database 230; and one or more modules or interfaces for interacting with the databases and/or controlling the features provided by the FMD server 215, e.g., an authentication module 235, a request module 240 and a location module 245. Each of these components is discussed in more detail below, however, it should be understood to one skilled in the art that the configuration illustrated is simply one possible configuration and that other configurations, with more or less components, are possible.

The FMD server 215 can include an account database 225 configured to store a user profile for each of a plurality of users. A user's profile can include a variety of information about the user, for example the information can include a user name, password, a list of all computing devices owned by the user, an identifier for each computing device owned by the user, user specified preferences, contact information, demographic information, etc.

The FMD server 215 can also include an authentication module 235, configured to communicate with the account database 225 and authenticate the user requesting to initiate lost mode on the lost user device 205 so that the request will be accepted. To properly authenticate a requesting user, the authentication module 235 can be configured to prompt the requesting user to enter authenticating information, such as a user name and password, or other predetermined information. To confirm that the authenticating information received from the requesting user is correct, the authentication module 235 can be configured to communicate with the account database 225 to confirm that the given user name and password match a user profile in the account database 225. If the given user name and password matches a user profile stored in the account database 225, the requesting user can be authenticated as having permission to request that lost mode be initiated on any of the computing devices associated with the user's profile. Although user name and password are used as an example, one skilled in the art will recognize that any variety of authenticating information can be requested from the user, including personal information or answers to predetermined security questions.

The FMD server 215 can also include a request module 240 configured to allow a user to request that lost mode be initiated on the lost user device 205. The request module 240 can be configured to provide the requesting user with an interface to create the request that lost mode be initiated on the lost user device 205. The interface can also be configured to receive request data from the requesting user. For example, request data can include an identifier identifying the lost user device. The identifier can be any type of identifier which can identify the lost user device. For example, if the lost user device 205 is a smart phone, the identifier can include a phone number associated with the device. Alternatively, the identifier can include a unique name or ID associated with the device. In some embodiments, an authenticated requesting user can be presented with a list of all user devices listed in the user's profile, and the requesting user can select which user device is lost.

In addition to the identifier, the request data can also include contact information. Contact information can include any type of information used to contact the requesting user. For example, contact information can include a phone number, e-mail address, physical address, instant messenger handle, website, etc. The request module 240 can be configured to prompt the requesting user for the contact information. In some embodiments, the request module 240 can be configured to use information specified in a user's profile data as the contact information. In some embodiments, the request module 240 can be configured to ask a requesting user whether the requesting user would like to use the contact information stored in the user's profile or enter new contact information.

The request data can also include a message specified by the requesting user. The message can be any message specified by the requesting user, which the requesting user would like to have displayed on the lost device 205. In some embodiments, the message can be predetermined and stored in the user's profile and the request module 240 can be configured to allow the requesting user to either use the stored message or create a new one.

The request data can also include a password. The password can be any type of password known to those skilled in the art such as a numeric pin, alphanumeric character password, gesture, etc. In some embodiments, the password can be preset by the requesting user and the request module 240 can be configured to allow the requesting user to either use the preset password or enter a new one.

The requesting user can access the FMD server 215 to request that lost mode be initiated on the lost device 205 by using the requesting device 220 to communicate with the FMD server 215. For example, in some embodiments, the requesting device 220 can include a web browser application configured to request access to the FMD server 215 via the communication network 210. In some embodiments, the authentication module 235 and request module 240, either entirely or partially can be running on the requesting device 220 and the requesting user can access the modules 235 240 from the requesting device 220 to create the request.

Upon receiving the request, including request data, from the requesting user and authenticating that the requesting user is authorized to initiate lost mode on the lost device 205, the request module 240 can be configured to send a command via a telecommunications network, including the received request data, to the lost device 205 to initiate lost mode. The lost device 205 can be configured to initiate lock mode on the lost device 205 upon receiving the command.

The FMD server 215 can also include a location module 245 configured to receive location data from the lost device 205 and to transmit the location to the requesting user. The location data can include data indicating the location of the lost device 205 as well as the time the lost device 205 was at that location. The location module 245 can be configured to transmit the location data to the requesting user in numerous ways. For example, in some embodiments, the location data can be sent to the requesting device 220. The location module 245 can determine whether the requesting device 220 is available, and if available, send the location date. If the requesting device 220 is not available, the location module can be configured to store the location data in a location database 230 on the FMD server 215 until the requesting device 220 is available. Alternatively, the location data may be sent to an email address of the requesting owner, either stored in the owner's profile or specified by the requesting owner during the request to initiate lost mode.

In some embodiments, the amount of location data stored in the location database 230 can be limited for privacy concerns. For example, the location data stored can be limited to only the most recent location of the lost device 205 and, upon receiving new location data, the previously stored location data can be erased from the location database 230. In some embodiments, the location data stored in the location database 230 can be erased after a specified time if not sent to the requesting user. For example, the location module 245 can be configured to erase any location data stored in the location database 230 after 24 hours. In some embodiments, the location data is erased after the location data is transmitted to the requesting user.

The location data can be presented to the requesting user in numerous ways. In some embodiments, the location data can be presented to the requesting user on a map that tracks the movement of the lost device 205. In some embodiments, the location data can be presented to the requesting user by giving the street address or GPS coordinates of the lost device 205.

The location data can also be sent to the requesting user in numerous ways. For example, in some embodiments the requesting user can log in to a web interface or application configured to communicate with the location module 245 to view the location of the lost device. In some embodiments, the location data can be e-mailed to the owner of the user device. In some embodiments, the location data can be sent to the requesting device 220 via a push notification to immediately update the requesting user of the location of the lost device 205.

Although the above examples of sending location data are described, these examples are not meant to be limiting and are just a few possible embodiments. One skilled in the art would recognize that there are numerous ways to send and present data.

The lost device 205 can contain a number of components. The components can include one or more databases for storing data relevant to the operation of the device, e.g., location database 250, and one or more modules or interfaces for interacting with the databases and/or controlling the features provided by the lost user device, e.g., a user interface module 255, lost mode module 260, and Find My Device (FMD) module 265. Each of these components is discussed in more detail below, however, it should be understood to one skilled in the art that the configuration illustrated is simply one possible configuration and that other configurations, with more or less components, are possible.

The lost device 205 can include a user interface module 255 configured to manage the user interface on the lost device 205. This can include displaying all user interface elements on the device such as icons, buttons, controls, date, time, notifications, alerts, etc., as well as the background, wallpaper, clock, etc.

The lost device 205 can also include a FMD module 265 configured to initiate lost mode on the lost device 205 upon receiving the command to initiate lost mode from the FMD server 215. For example, in some embodiments, the FMD module 265 can be a daemon running in the background on the lost device 205 and configured to communicate with the operating system to initiate applications and modules running on the lost device 205 as well control hardware components of the lost device 205.

The FMD module 265 can be configured to receive the command from the FMD server 215 to initiate lost mode on the lost device 205. Upon receiving the command, the FMD module 265 can be configured to execute the lost mode module 260. Further, the FMD module 265 can be configured to communicate the request data received from the FMD server 215 to the lost mode module 260.

The lost mode module 260 can be configured to run with or as part of the user interface module 255 to graphically lock the lost device 205 and, in some embodiments, require a password to unlock the phone.

In some embodiments, the lost mode module 260 can be a plug-in application configured to communicate with the user interface module 255 through use of an Application Programming Interface (API) provided by the user interface module 255. The lost mode module 260 can be configured to instruct the user interface module 255 to lock the lost device 205 and to suppress functionality of the lost device 205. For example, the lost mode module 260 can instruct the user interface module 255 that certain user interface elements are not to be displayed on the lost device 205. For example, the lost mode module 260 can instruct the user interface module 255 to suppress all user interface elements that would allow access to data and/or applications on the lost device 205. Further, the lost mode module 260 can instruct the user interface module 255 to suppress other features such as presenting notifications on the lost device 205. Although presenting notifications is suppressed, the lost device 205 can still be enabled to receive data which would normally trigger the notification being presented.

In some embodiments, the lost mode module 260 can suppress functionality that associates a stored contact name with an incoming communication. For example, while in lost mode, a lost device 205 such as a smart phone can remain enabled to receive incoming phone calls so that, for example, a requesting user can contact the lost device 205. The lost device 205 can have contact data, such as a contact name, associated with the contact number so that, when receiving a call from the contact number, the contact name is presented on the lost device 205 rather than the contact number. The lost mode module 260 can suppress this functionality to protect the contact name from being viewed by an unauthorized user. In some embodiments, the contact number will be displayed rather than the associated contact name. In some embodiments, both the contact name and the contact number can be protected and a message indicating only that an incoming call is being received can be displayed.

In some embodiments, the lost mode module 260 can be configured to suppress the functionality to manually power off the lost device 205. This can protect the device from a potential thief powering off the lost device 205 to prevent the lost device 205 from transmitting location data describing the location of the lost device 205 and thus being tracked. In some embodiments, the lost mode module 260 can be configured to cause the lost device 205 to appear as if though it is powering off, while the lost device 205 in actuality remains powered on. For example, the lost mode module 260 can be configured to present a display that imitates the lost device 205 turning off and being in an off state upon receiving an input to manually turn off the lost device 205. This can fool a potential thief into believing that the lost device 205 is turned off and thus that the location of the lost device 205 cannot be tracked.

In some embodiments, the lost mode module 260 can instruct the user interface module 255 to suppress any set display preferences such as a background or wallpaper. For example, the lost mode module 260 can be configured to instruct the user interface module 255 to display only a plain standard background such as a plain grey background.

The lost mode module 260 can also instruct the user interface module 255 to present the contact information and message received from the FMD server 215. In some embodiments, the lost mode module 260 can be configured to vary its display based on whether a message and contact information has been specified by the requesting user. For example, if a requesting user does not enter contact information, the lost mode module can 260 be configured to display only the message, or vice versa, only the contact information if the requesting user did not enter a message.

In some embodiments, the lost mode module 260 can be configured to display a default message or contact information if either is not specified by the requesting user. For example, if the requesting user only specifies contact information, a default message such as "Please contact me at this number" can be displayed. Alternatively, if the requesting user only specifies a message, the lost mode module 260 can be configured to display a known contact for the requesting user. For example, if the lost device 205 is a tablet PC, the lost mode module can display an e-mail address associated with an e-mail application on the lost device.

In some embodiments, the lost mode module 260 can be configured to display a default message and contact information if neither is supplied by the requesting user. In some embodiments, if the requesting user does not specify a message or contact information, the lost mode module 260 can be configured to silently lock the lost device 205 so that it does not appear that lost mode has been initiated on the lost device 205. For example, the lost device 205 can appear to be locked and require a password as though the lost device 205 was previously configured to require a password rather than having been remotely locked. In some embodiments, silently locking the lost device 205 can include configuring the lost device 205 to appear as if though it is powered off, inoperative, unresponsive, etc. In addition to presenting the contact information, the lost mode module 260 can also be configured to instruct the user interface module 255 to present a user interface element on the lost device 205 that is enabled with the limited functionality to allow the lost device 205 to contact the requesting user using the contact information. For example, if the lost device 205 is a smart phone and the provided contact information is a phone number, the lost mode module 260 can be configured to instruct the user interface module 255 to present the contact number and provide a user interface element which enables the smart phone the limited functionality of making outbound phone calls to the provided contact number, while outbound calls to all other numbers are prohibited. Thus, if the smart phone is found, an honest person can easily contact the owner of the device by simply selecting the user interface element to be connected to the provided contact number. Alternatively, the contact information can be an e-mail address and the user interface element can allow the user to compose and send an e-mail to the owner of the device at the e-mail address provided.

In addition to executing the lost mode module 260, in some embodiments, the FMD module 265 can also be configured to transmit location data to the requesting user. For example, the FMD module 265 can be configured to collect location data from a GPS component of the lost device 205 and periodically send the location data to the requesting user. The location data can be any type of data that can identify the location of the lost device. For example, the location data can be GPS coordinates, a street address, etc. In addition, the location data can include the time that the lost device was at the specified location. For example, the FMD module 265 can be configured to receive the time from an internal clock running on the lost device 205.

In some embodiments, the FMD module 265 can be configured to gather the location data from a location database 250 on the lost device 205. The location database 250 can be configured to store location data and a time associated with the location data. In some embodiments, the location database 250 can be configured to delete location data after a predetermined time. For example, to limit the amount of data stored about a user and protect privacy, the location data can be deleted after 24 hours and thus the location database 250 will only contain location data identifying where the lost device 205 has been for the previous 24 hour period.

In some embodiments, the location data can include further status data such as the remaining battery life of the lost device 205 or whether lost mode has been initiated on the lost device 205. Any status data can be transmitted with the location data to the requesting user.

In some embodiments, the FMD module 265 can be configured to send the location data to the FMD server 215 which then sends the location data to the requesting user. In some embodiments, the FMD module 265 sends the location data to the requesting device 220. In some embodiments, the FMD module determines whether the requesting device 220 is available to receive the location data, and if so, send the location data to the requesting device 220, but if the requesting device is not available, the FMD module 265 sends the location data to the FMD server 215. In some embodiments, the FMD module 265 sends the location data to a personal account associated with the requesting user, such as the requesting user's e-mail account. Although the above examples of sending location data to a requesting user are described, these are just possible embodiment and are not meant to be limiting. One skilled in the art would recognize that the location information can be sent to the requesting user in numerous other ways.

The FMD module 265 can be configured to schedule transmission of the location data in numerous ways. For example, in some embodiments, the FMD module 265 can be configured to send the location data in set time intervals such as every 10 minutes, 30 minutes, 1 hour, etc. In some embodiments, the location data can be sent based on a heuristic that determines when the requesting user would want the location data sent. For example, the heuristic can conclude that based on the lost device 205 making a significant movement in location, the requesting user would want to be updated of the new location of the lost device 205.

In some embodiments, the FMD module 265 can query the location of the lost device 205 on a set schedule to determine whether the lost device 205 has made a significant movement. In some embodiments, the lost device 205 can offer functionality that can notify the FMD module 265 when the lost device 205 has made a significant movement, such as through an API.

Alternatively, in some embodiments, the heuristic can determine that the requesting user would like to be updated about the location of the lost device based on the time of day, for example first thing in the morning when the requesting user is likely waking up. In some embodiments, the heuristic can determine that the requesting user would like to be updated about the location of the device upon the lost device 205 regaining network connection. For example, the lost device 205 might be transported to an area where network connection is unavailable. The FMD module 265 can be configured to send the location data to the requesting user immediately upon the lost device 205 regaining network connection.

In some embodiments, the heuristic can determine that the requesting user would want messages sent less frequently, for example when the battery is running low and sending location data less frequently will preserve the battery life and enable the lost device 205 to be tracked as long as possible. In some embodiments, the location data can be transmitted based upon a combination of a schedule and a heuristic. For example, location data can be transmitted every hour, but only if the lost device 205 has made a significant movement. The above examples are only some possible embodiments and are not meant to be limiting. One skilled in the art would recognize that the location data can be scheduled for transmission in numerous ways known to those of ordinary skill in the art.

In addition to transmitting location data, the FMD module 265 can also be configured to transmit other pertinent information to the requesting user. For example, the remaining battery life can be transmitted to the requesting user. This can be sent and presented with the location data so that the requesting user can be informed of the remaining battery life of the lost device 205 at the time it was at the location. Alternatively, updates regarding the remaining battery life can be transmitted to the requesting user at predetermined milestones, such as 20% battery life remaining or 10% battery life remaining.

In some embodiments, the remaining battery life can be presented as an estimation of how much time is remaining until the lost device 205 runs out of battery life and updates regarding the remaining battery life can be transmitted to the requesting user at milestones based upon the amount of time remaining until the lost device runs out of power. For example, an update can be sent notifying the requesting user that the lost device 205 will run out of battery power in 10 minutes.

The remaining amount time until the battery runs out of power can be estimated in numerous ways. For example, the remaining amount of time until the lost device 205 runs out of battery life can be estimated based in the current live power consumption rate of the lost device 205. In some embodiments, the remaining amount of time until the lost device runs out of battery life can be estimated based on historical data consumption of the lost device. Although the above examples are given, they are only some possible embodiments and not meant to be limiting. One of ordinary skill in the art would recognize that the remaining amount of time until the lost device 205 runs out of battery life can be estimated in any number of ways known in the art.

In some embodiments, the FMD module 265 can be configured to send status data to the requesting device 220. For example, the FMD module 265 can send a notification to the requesting user upon the lost device 205 being "found". For example, the notification can be sent immediately upon a status change occurring on the lost device that indicates that the lost device is in the possession of a person. For example, the status change can occur upon a first action being taken on the lost device 205 or a first movement being detected by the lost device 205 after lost mode has been initiated. Thus, the requesting user can ascertain whether the lost device is in the possession of another person or if it is still lost.

In some embodiments, the FMD module 265 can be configured to proactively attempt to connect to available network connections. For example, a lost device 205 such as a laptop or tablet PC that does not have a mobile network connection, can be configured to repeatedly check whether wireless connections (e.g., WLAN, Bluetooth, etc.) are available and attempt to connect to any unprotected networks so that location data updates or other information can be sent to the requesting user.

To terminate lost mode on the lost device 205, the lost mode module 260 can be configured to instruct the user interface module 255 to present a prompt for a password to be entered. If the proper password is entered, the FMD module can be configured to terminate the lost mode module 260, thus returning the user interface module 255 to its regular functionality. The lost device 205 can be unlocked and all suppressed functionality can be restored. Further, the FMD module 265 can stop collecting and sending location data to the requesting user.

In some embodiments, lost mode can be terminated remotely. For example, the lost device 205 can receive a command from the requesting user that lost mode be terminated. The command can include the password or require the password be entered prior to being sent. In some embodiments, the command can be received from the FMD server 215. In some embodiments, the command can be received from the requesting device 220.

Figure 3:
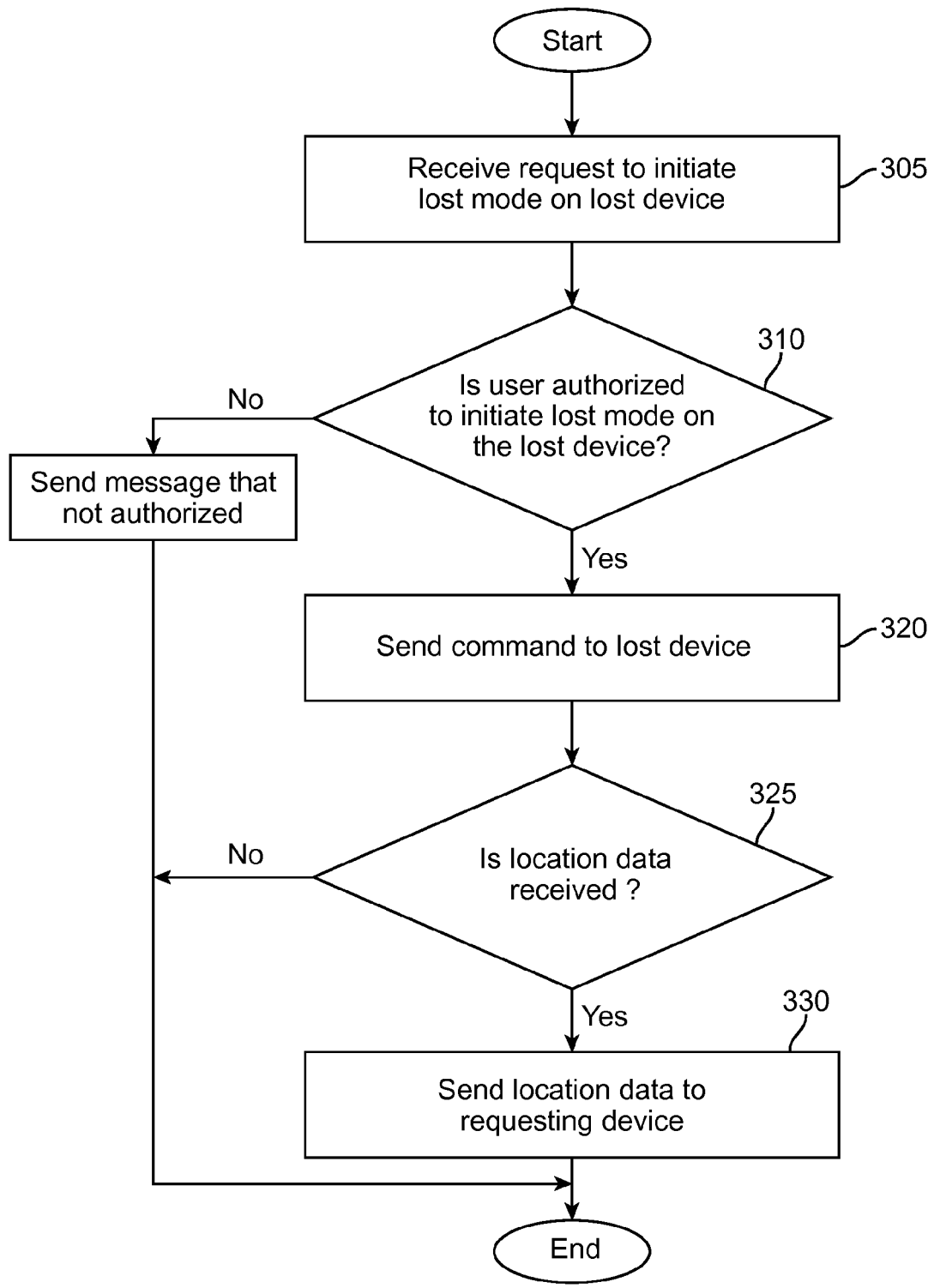
FIG. 3 illustrates an exemplary method embodiment of remotely initiating lost mode on a lost device.

FIG. 3 illustrates an exemplary method embodiment of remotely initiating lost mode on a lost device. As illustrated, the method begins with a request being received by the server to initiate lost mode on a lost device 305. The request can inform the server that the lost device is lost and that the requesting user would like to initiate lost mode on the lost device. Additionally, the request can include request data such as a device identifier, contact information, message and password. The device identifier can be any type of data that can identify the lost device such as a phone number, UUID, device name, etc.

The request data can also include contact information and a message provided by the requesting user to be displayed on the lost device. The contact information can be any information identifying how the requesting user can be contacted. For example, the contact information can be a phone number and be accompanied with the message, "Please call this number if found." Alternatively, the contact information can be an e-mail address and be accompanied with the message, "Please e-mail me at this address if you find this device."

In some embodiments, the request data can also include a password. For example, the requesting user can set a password that, upon lost mode being initiated on the lost device, can be used to terminate lost mode and return the lost device to regular functionality.

The requesting user can request that lost mode be initiated on the lost device in numerous ways. For example, in some embodiments, the requesting user can log into a website configured to prompt a requesting user for request data and send a request that lost mode be initiated on the lost device. In some embodiments, the requesting user can use an application running on a requesting device in network communication with the server to request that lost mode be initiated on the lost device. The application can be configured to prompt the user for request data used to create the request.

Upon receiving the request at the server, the method continues to block 310 where the server determines whether the requesting user is authorized to initiate lost mode on the lost device. To accomplish this, the server can require that the requesting user enter authentication information. For example, the requesting user can be prompted to enter a user name and password associated with the lost device. Alternatively, the requesting user can be prompted to answer predetermined authentication questions. For example, the authentication questions can ask for personal information associated with the known owner of the lost device such as the owner's social security number, or mother's maiden name, etc.

If it is determined that the requesting user is not authorized to initiate lost mode on the lost device, the method can proceed to block 315 wherein the server sends the requesting user a message that the requesting user is not authorized to initiate lost mode on the lost device and the method ends.

If it is determined that the requesting user is authorized to initiate lost mode on the lost device, the method continues to block 320 wherein a command is sent to the lost device instructing the lost device to initiate lost mode. The command can include the request data received in the request to initiate lost mode, such as the contact info, message, password, etc. An exemplary method of lost mode being initiated by the lost device is illustrated in FIG. 4 and explained in detail below.

The method illustrated in FIG. 3 then determines whether location data is received from the lost device 325. Location data can be any type of data that describes the location of the lost device. For example, location data can include the global positioning system (GPS) coordinates of the lost device or the street address of the lost device.

If no location data is received from the lost device, the method ends. If location data is received, the server can send the location data to the requesting user 330.

Figure 4:
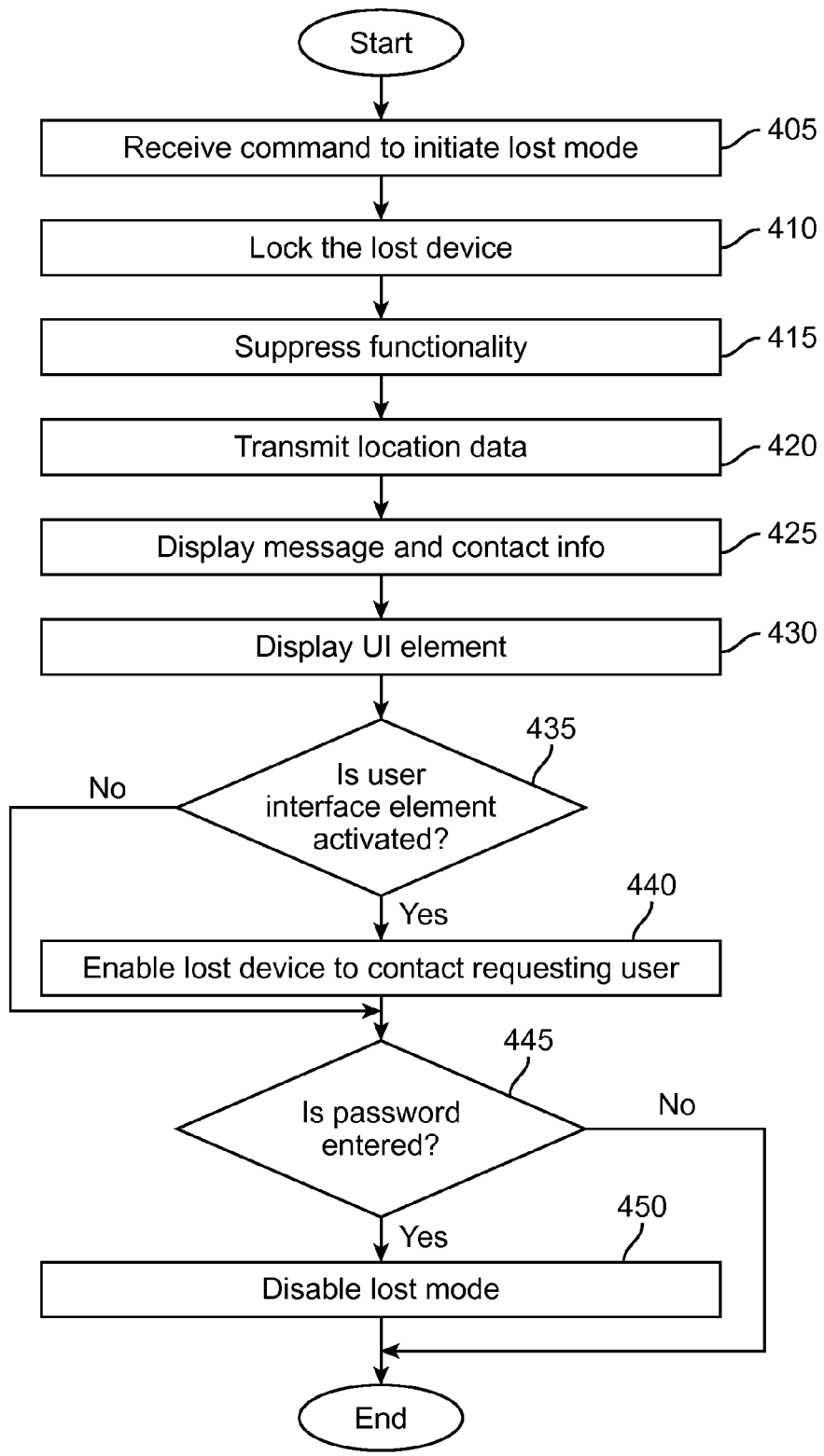
FIG. 4 illustrates an exemplary method embodiment of initiating lost mode on the lost device.

FIG. 4 illustrates an exemplary method embodiment of initiating lost mode on the lost device. As illustrated the method begins at block 405 when a command is received at the lost device to initiate lost mode. The command can be received from a server that has authenticated the requesting user as being authorized to request that lost mode be initiated on the lost device. The command can include request data such as contact information, a message and a password.

After receiving the command, the method then continues to block 410 wherein the lost device locks itself from use. For example, this can include presenting a lock screen that is void of any UI elements that provide access to functionality of the lost device or any data or applications stored on the user device. In some embodiments, the lock screen can prompt a user to enter a password that will unlock the device. In some embodiments, the lost device can be silently locked so that a potential thief is not alerted to the fact that lost mode has been initiated on the lost device.

In some embodiments, the lost device can also be locked so that data stored on the lost device cannot be accessed from another computing device connected to lost device. For example, if the lost device is a smart phone connected to a desktop computer, the smart phone can be locked so that the files stored on the smart phone cannot be accessed by the desktop computer. Locking the lost device can protect the lost device and the data stored thereon from being accessed by an unauthorized user.

Upon locking the lost device, the method next suppresses select functionality 415 of the lost device. This can include functionality that enables use of the lost device or presents information meant for the owner of the lost device. For example, functionality such as notifications and alerts displayed on the lost device can be suppressed so that information intended for the owner of the lost device cannot be viewed by an unauthorized user. In some embodiments, functionality that displays a stored contact name associated with contact information is suppressed to protect the stored contact name from being viewed by an unauthorized user. For example, a contact name associates with an incoming phone number is not displayed when receiving a communication from the incoming phone number. In some embodiments, any external buttons of the lost device can be suppressed to prevent the user from accessing functionality of the lost device.

In some embodiments, the functionality to turn the lost device off can be suppressed to prevent a thief from prohibiting the lost device from sending location information. In some embodiments, the lost device can be configured to appear as if though it is powering off while it remains powered on, thus fooling a potential thief about the current state of the device and not alarming the thief to the possibility that the lost device is being tracked.

Further functionality that can be can suppressed can include outgoing calls, voice command functionality, camera, video camera, microphone, power, etc. Although only the above examples are given, they are only a few possible embodiments and are not meant to be limiting. One skilled in the art would recognize that any functionality of the lost device can be suppressed.

Once the lost device is locked 410 and functionality is suppressed 415, the method continues to block 420 wherein the lost device transmits location data to the requesting user. The location data can be any data that identifies the location of the lost device. For example, the location data can be the GPS coordinates of the lost device.

Figure 5:
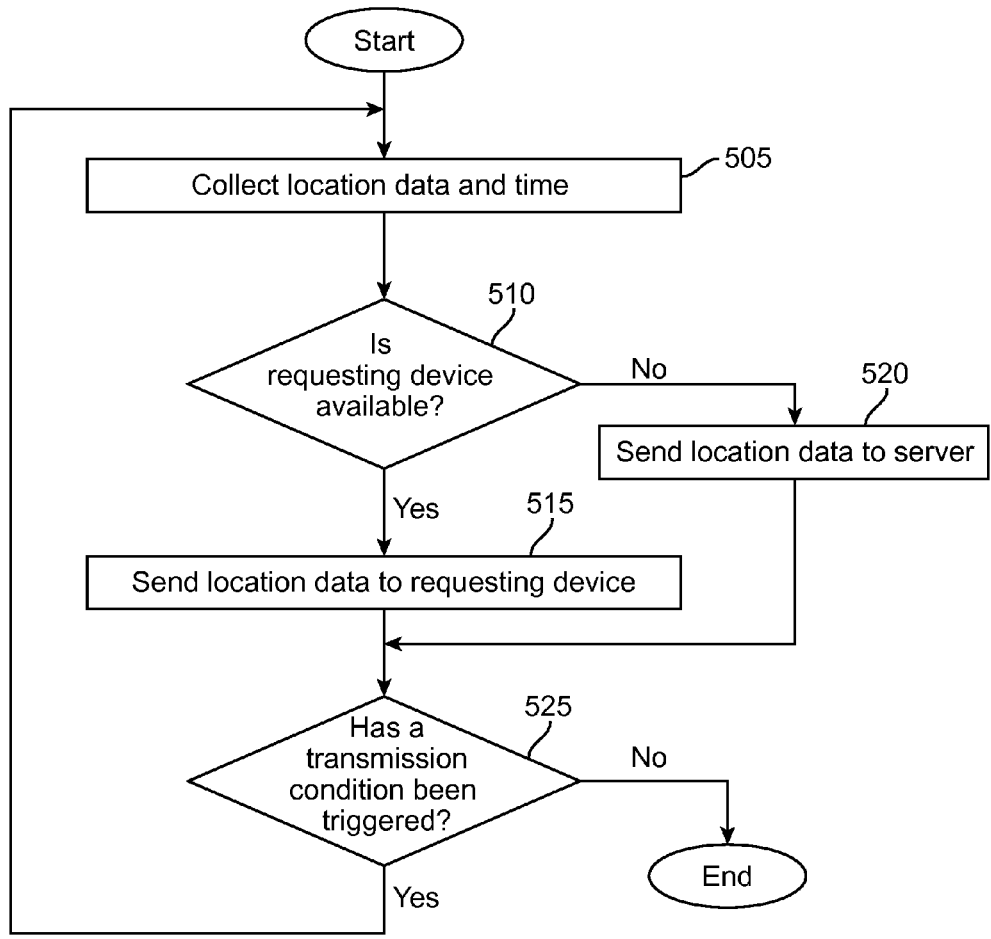
FIG. 5 illustrates an exemplary method embodiment of transmitting information data to the requesting user.

FIG. 5 illustrates an exemplary method embodiment of transmitting information data to the requesting user. As illustrated the method begins by collecting location data and the time 505 the location data was collected. For example, the lost terminal can include a GPS device capable of communicating with a GPS satellite to receive the GPS coordinates of the lost device. The lost device can collect the location data directly from the GPS device. Alternatively, in some embodiments, the GPS device can periodically store the location data in a database on the lost device and the location can be collected from the database. The time the location data was collected can be gathered from an internal clock running on the lost device. In some embodiments, the time can be received from the GPS satellite when the location GPS coordinates of the lost device are received from the satellite.

After collecting the location data and the associated time, the method determines whether the requesting device is available 510 to receive the location data. The requesting device can be available if the requesting device is in a state that allows data to be received at the requesting device from the lost device. For example, in some embodiments the requesting device is available if the requesting device is in network communication with the lost device. In some embodiments, the requesting device is available if the requesting device is logged into or running an application configured to receive and present the location data. If the requesting device is available, the lost device can transmit the location data to the requesting device 515. If the requesting deice is not available, the lost device can transmit the location data to the server 520 where it can be stored until the requesting device is available or until the requesting device accesses it from the server.

After the location data has been transmitted, the method can determine whether a transmission condition has been triggered 525. A transmission condition can be a condition that, when met, instructs the lost device to transmit the location data to the requesting user. In some embodiments, the transmission condition can be triggered upon a predetermined amount of time passing since the last time location data was transmitted. For example the transmission condition can be triggered upon an hour passing from the last time location data was transmitted.

In some embodiments, the transmission condition can be triggered upon the lost device making a significant change in location from the last transmitted location. For example, if the transmission condition can be triggered if the lost device travels a mile or more from the previously transmitted location.

The examples given of when a transmission condition can be triggered are just example embodiments and not meant to be limiting. One of ordinary skill in the art would recognize that the disclosed system can be configured in any way know in the art.

If it is determined that a transmission condition has been triggered, the method can return to block 505. If a transmission condition is not triggered, the method can end.

Returning to FIG. 4, upon transmitting the location data, the method can then continue to block 425 wherein the contact information and the message are displayed on the lost device. For example, the contact information can be a phone number associated with the requesting user and the message can state "please call this number if you find this device." This allows a Good Samaritan who finds the lost device to be able to easily contact the requesting user.

The method can also display a user interface element 430 that, if selected 435, enables the lost device to contact the requesting user at the given contact information 440. For example, if the lost device is a cellular phone and the contact information is a telephone number, a user interface element can be displayed on the lost device that, upon selection, enables the lost device to make an outbound call to the phone number specified as the contact information. This allows an honest person to easily contact the requesting user to contact from the lost device itself by simply pressing a single button. Although the user interface element is configured to enable suppressed functionality, such as making an outbound call, the enabled functionality can be limited to the given contact information. For example, a lost smart phone can be enabled to only make a call to the phone number provided by the requesting user.

A requesting user can choose to terminate lost mode on the lost device by entering a password. The method can determine whether the password has been entered 445, and if so terminate lost mode 450. Terminating lost mode can include removing the lock on the lost device and restoring all suppressed functionality of the lost device. In some embodiments, the password can be entered on the lost device itself. In some embodiments, the password can be entered remotely, for example on a requesting device in communication with the server, and a command that the password has been entered can be sent to the lost device.

Figure 6:
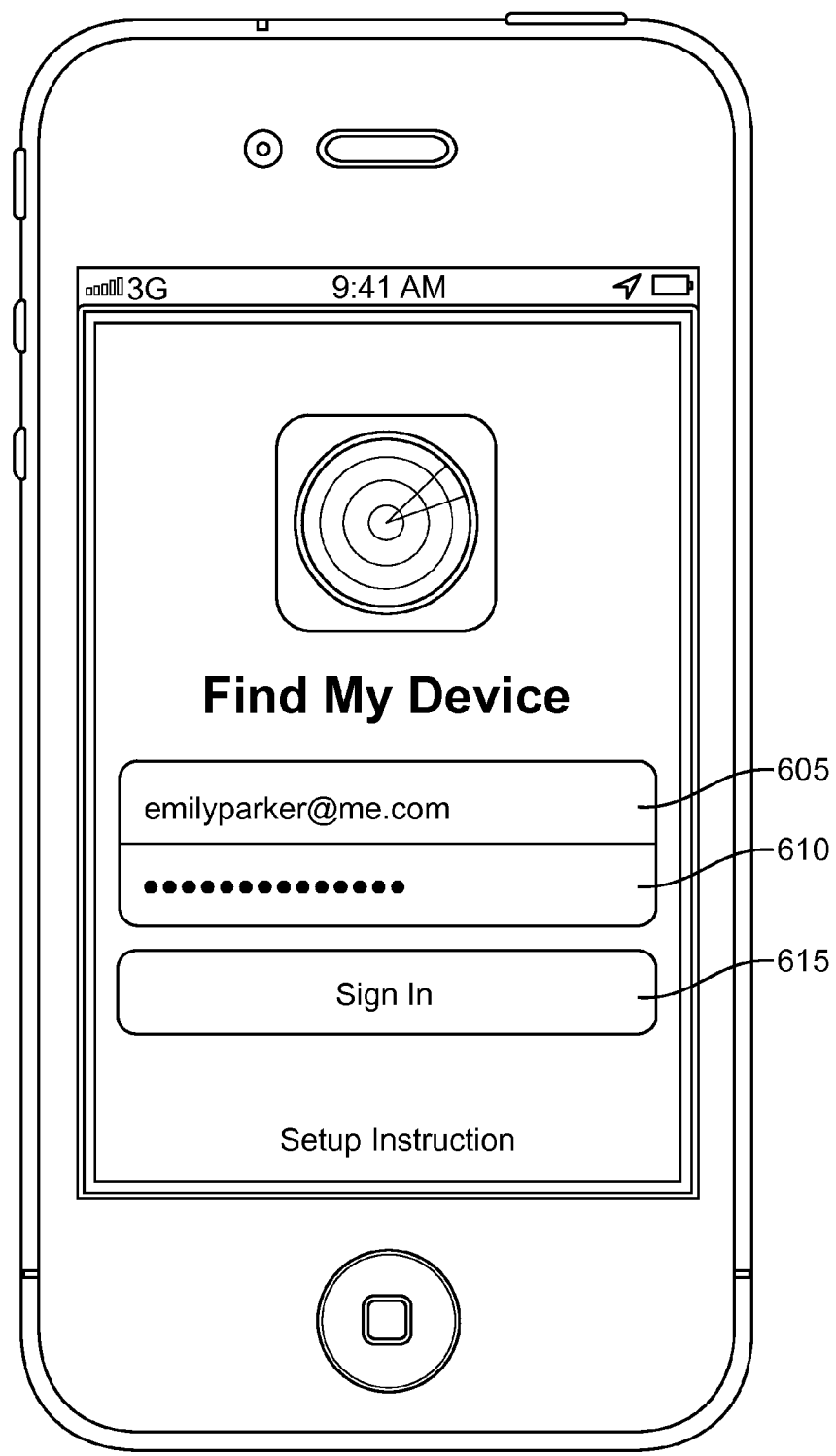
FIG. 6 illustrates a screenshot of an exemplary interface configured to authenticate a requesting user.

FIG. 6 illustrates a screenshot of an exemplary interface configured to authenticate a requesting user. As illustrated, a requesting user can be prompted to enter a user name 605 and password 610 into the interface. A sign in button 615 can also be presented and configured to, upon selection, submit the requesting user's entered user name 605 and password 610. The submitted user name and password can be compared to records in a user database to authenticate the requesting user. If the provided user name 605 and password 610 are a match with the stored records, the requesting user can be authenticated.

Figure 7:
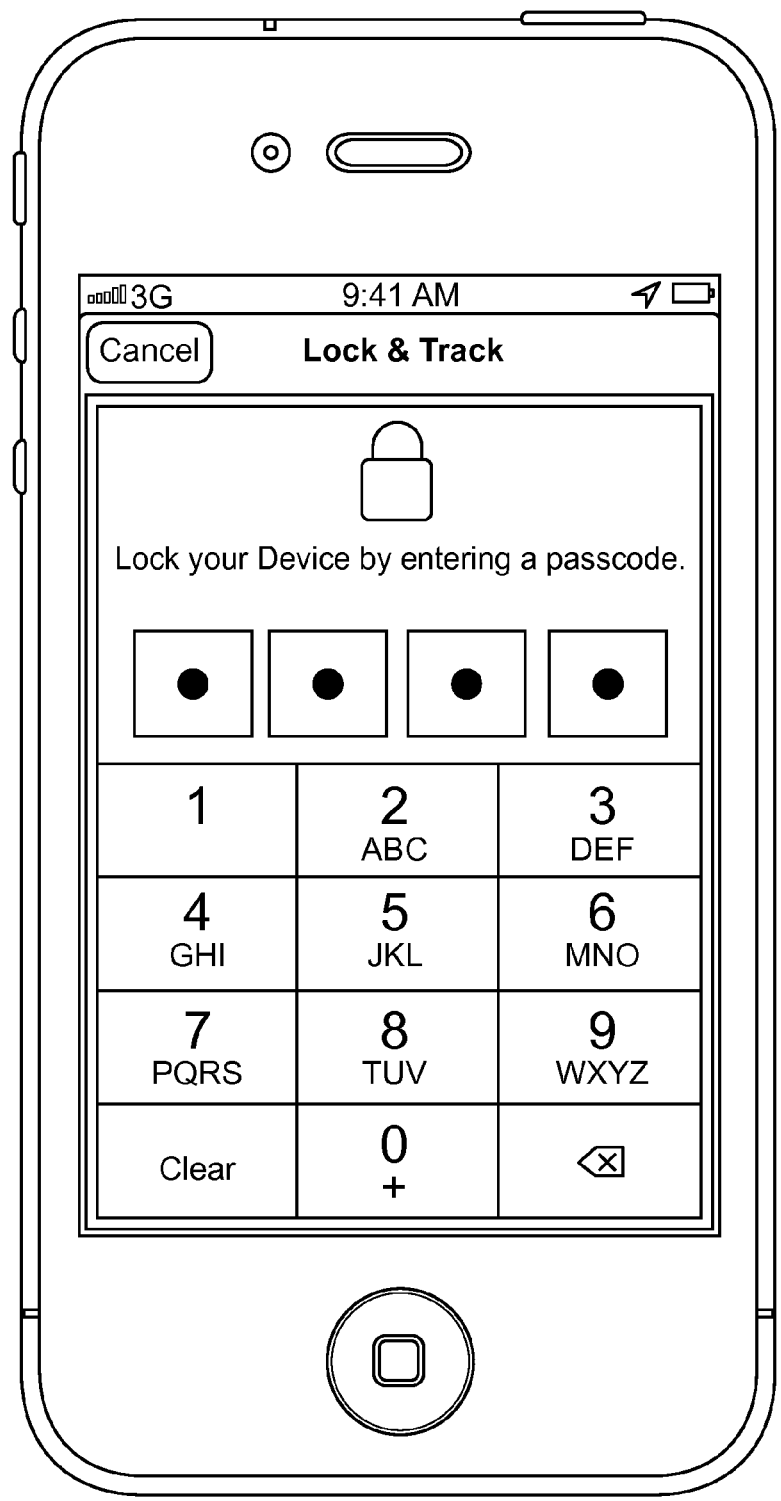
FIG. 7 illustrates a screenshot of an exemplary interface configured to receive a password from the requesting user.

FIG. 7 illustrates a screenshot of an exemplary interface configured to receive a password from the requesting user. As illustrated, the requesting user can enter the password using the keypad provided. In some embodiments, this interface can be configured to receive a predetermined password to authenticate a requesting user. In some embodiments, the interface can be configured to receive a new password from an already authenticated requesting user. The new password can be used to unlock the lost device after lost mode has been initiated on the lost device.

Figure 8:
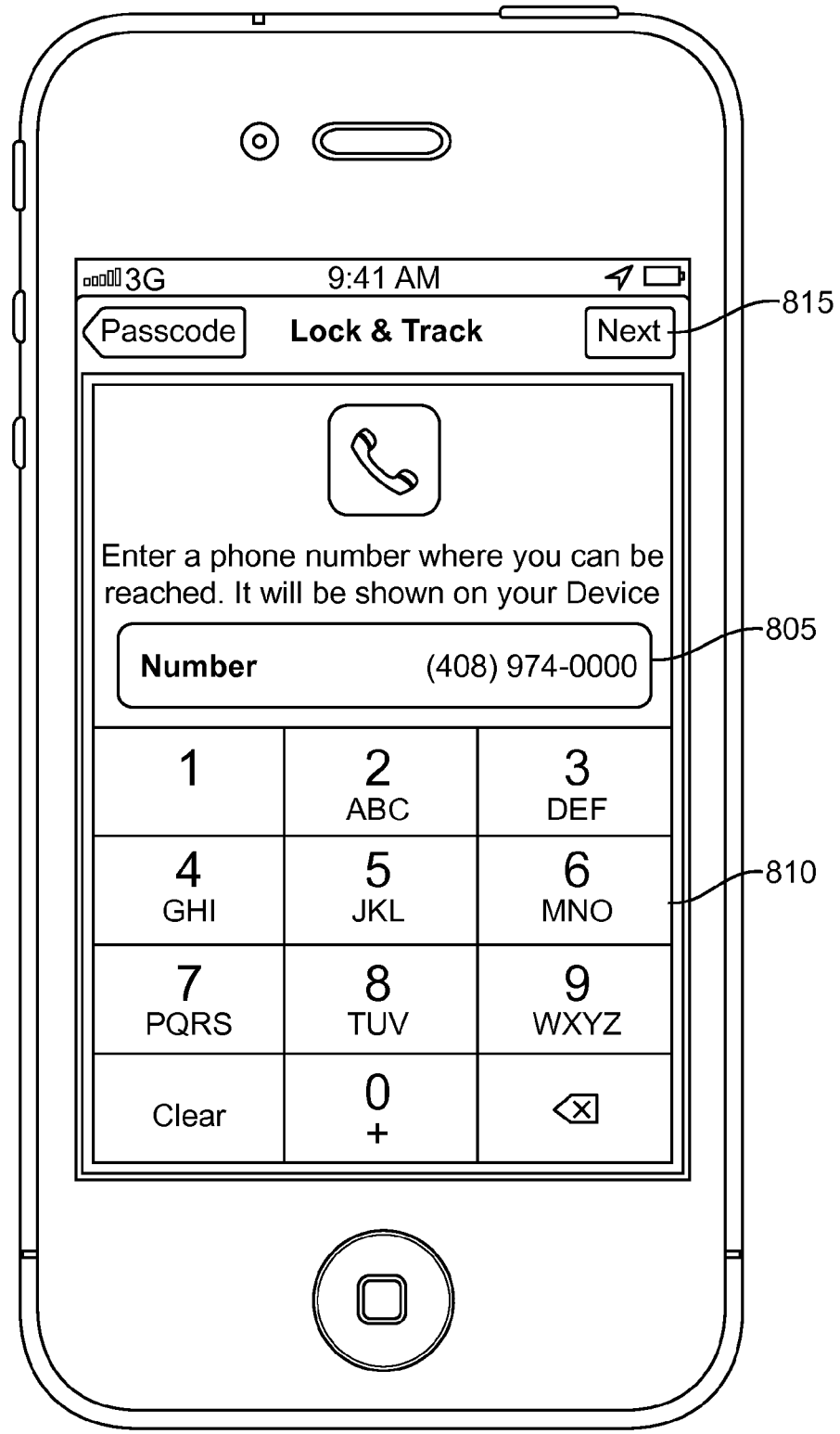
FIG. 8 illustrates a screenshot of an exemplary interface wherein a requesting user can enter contact information.

FIG. 8 illustrates a screenshot of an exemplary interface wherein a requesting user can enter contact information. The contact information can be included as part of a request to initiate lost mode on a lost device. The contact information can be displayed on the lost device so that, if found, the requesting user can be contacted. As illustrated, the requesting user can enter contact information 805, such as a phone number, using a provided keypad 810. The user interface can also include a next button 815 configured to receive the contact information 805 entered by the requesting user and direct the user to the interface illustrated in FIG. 9.

Figure 9:
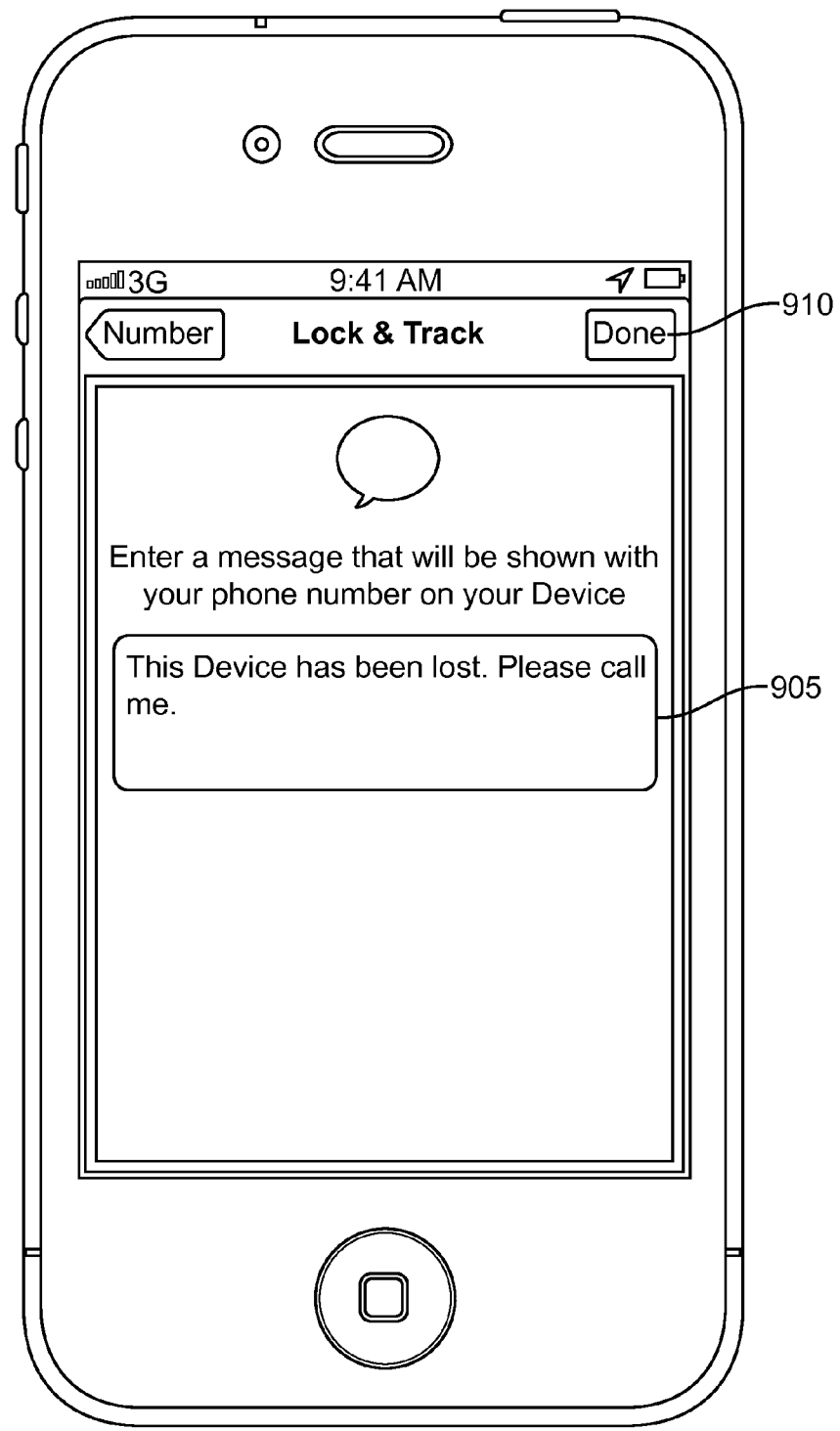
FIG. 9 illustrates a screenshot of exemplary embodiment of an interface wherein a requesting user can enter a message.

FIG. 9 illustrates a screenshot of an exemplary embodiment of an interface wherein a requesting user can enter a message. The message can be included as part of a request to initiate lost mode on a lost device. The message can be displayed on the lost device upon lost mode being initiated. As illustrated, the interface can provide the user with a message input field 905 configured to receive the message from the requesting user. Although not illustrated, a requesting user can enter the message using a keyboard or other input device. The interface can also include a done button 910 that is configured to complete the request to initiate lost mode on the lost device. Upon selection of the done button, the entered message as well as any other request data such as a password and contact information, can be assembled into a request to initiate lost mode on a lost device and sent to the server.

Alternatively, the done button can automatically send a command directly to the lost device to initiate lost mode using the included request data.

Figure 10:
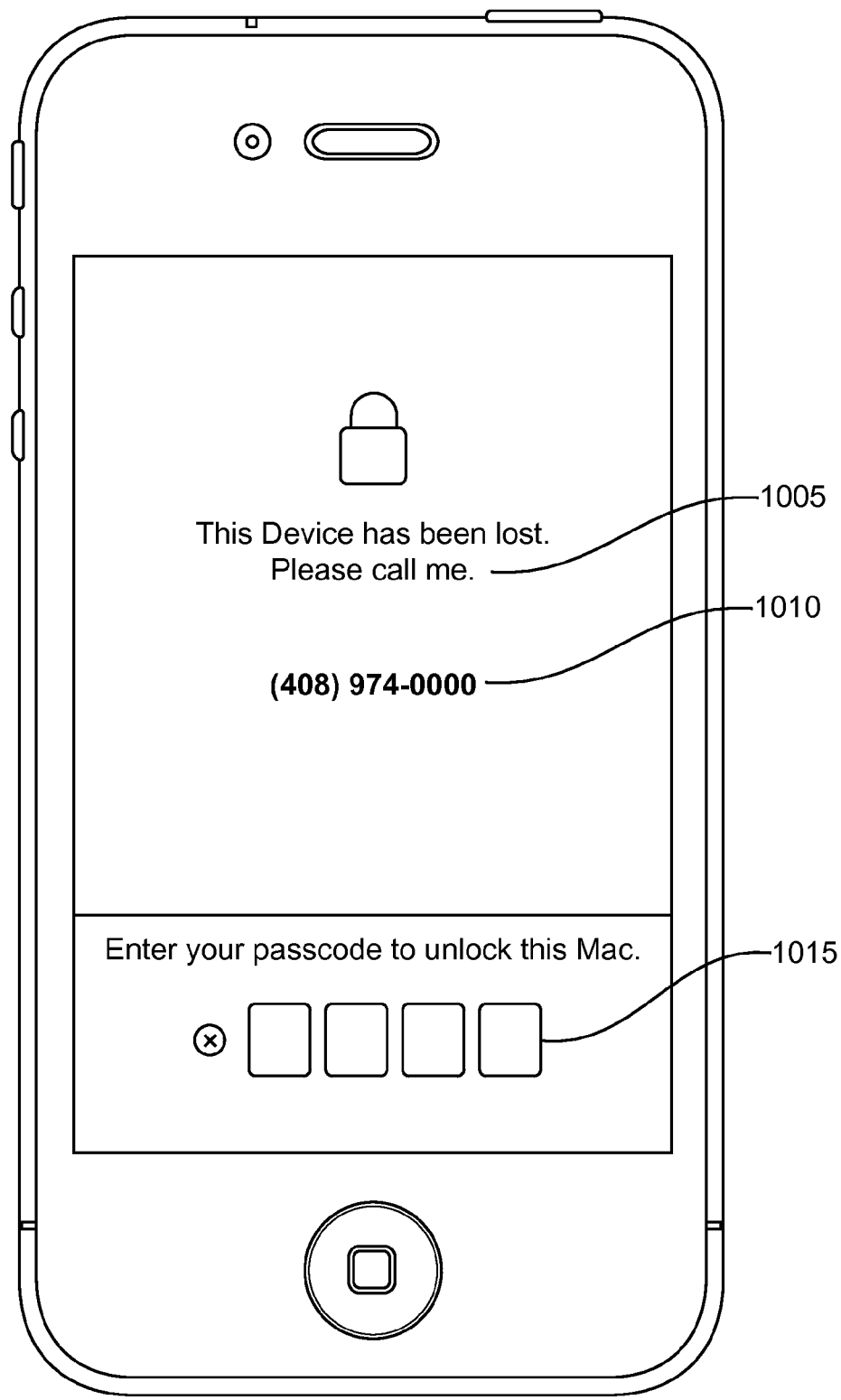
FIG. 10 illustrates a screenshot of an exemplary embodiment of a lost device after lost mode has been initiated.

FIG. 10 illustrates a screenshot of an exemplary embodiment of a lost device after lost mode has been initiated. As illustrated, the lost device has been locked and is void of all user interface elements that would allow access to functionality of the lost device or data or applications stored on the user device. The lost device can display the message 1005 alerting any person who finds the lost device that it has been lost and to please call the requesting user. Further, the requesting user's contact information 1010 can also be displayed. The illustrated embodiment also allows a user to enter a password which, if entered correctly, unlocks the lost device and terminates lost mode, thus restoring the lost device to its regular function state.

Figure 11:
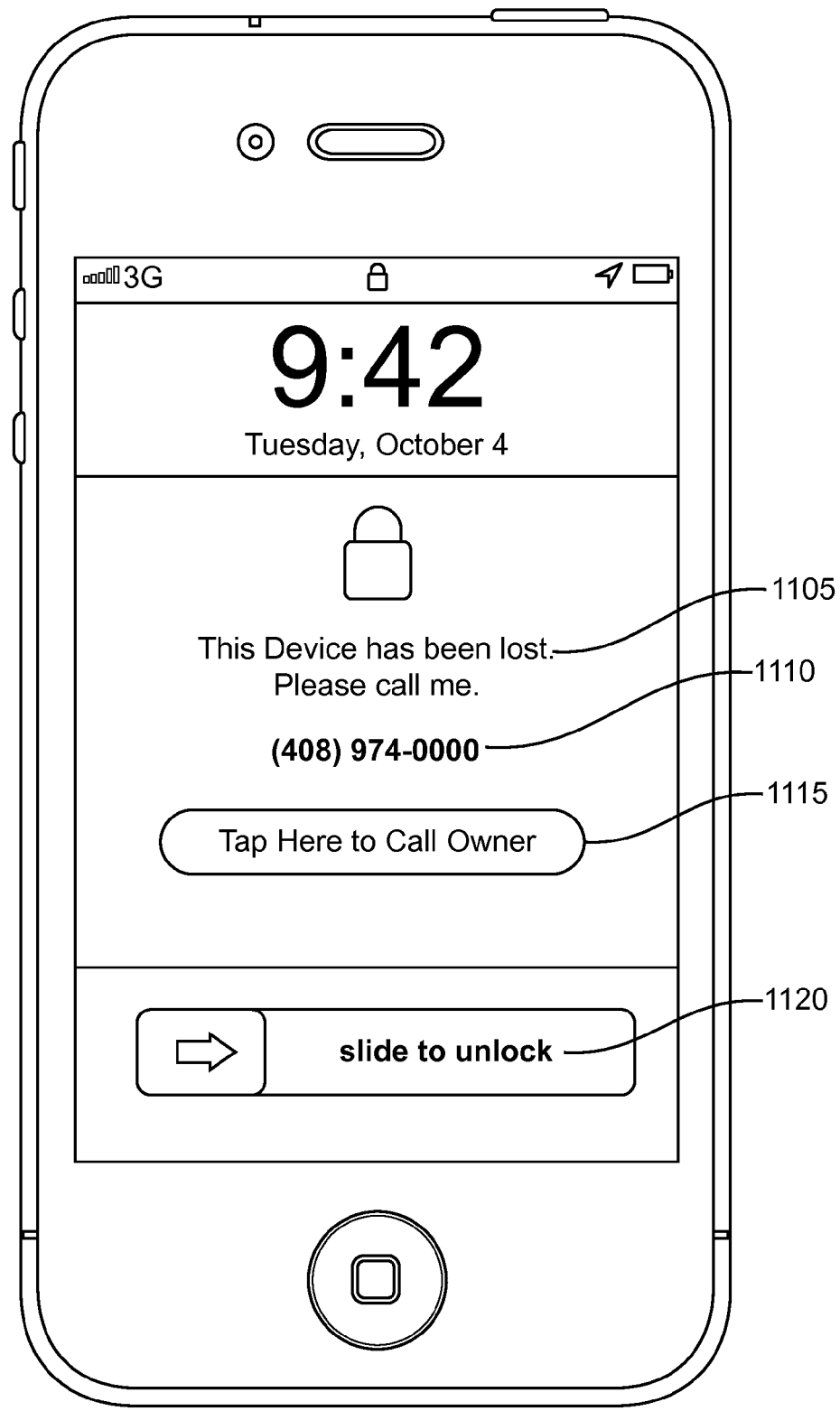
FIG. 11 illustrates a screenshot of an exemplary embodiment of a lost device after lost mode has been initiated.

FIG. 11 illustrates a screenshot of a different exemplary embodiment of a lost device after lost mode has been initiated. Similar to the embodiment illustrated in FIG. 10, the lost device can be locked and the message 1105 and contact information 1110 can be displayed to alert any person that finds the lost device that the device is lost and to please contact the requesting user.

Additionally, a user interface element 1115 can be included which enables the lost device to contact the requesting user using the contact information. As illustrated, the user interface element can be a button title "Tap here to Call Owner" which is configured to contact the requesting user upon selection. While the user interface element is configured to allow the lost device make an outbound call to the given contact information phone number, outbound calls cannot be made to any other phone numbers, nor is any other locked or suppressed functionality enabled.

This embodiment also includes a slide to unlock button 1120 rather than the password interface 1015 of FIG. 10. This is just another possible embodiment and the slide to unlock button 1120 can be configured to bring up another page wherein the user is prompted to enter a password to unlock the lost device.

Figure 12:
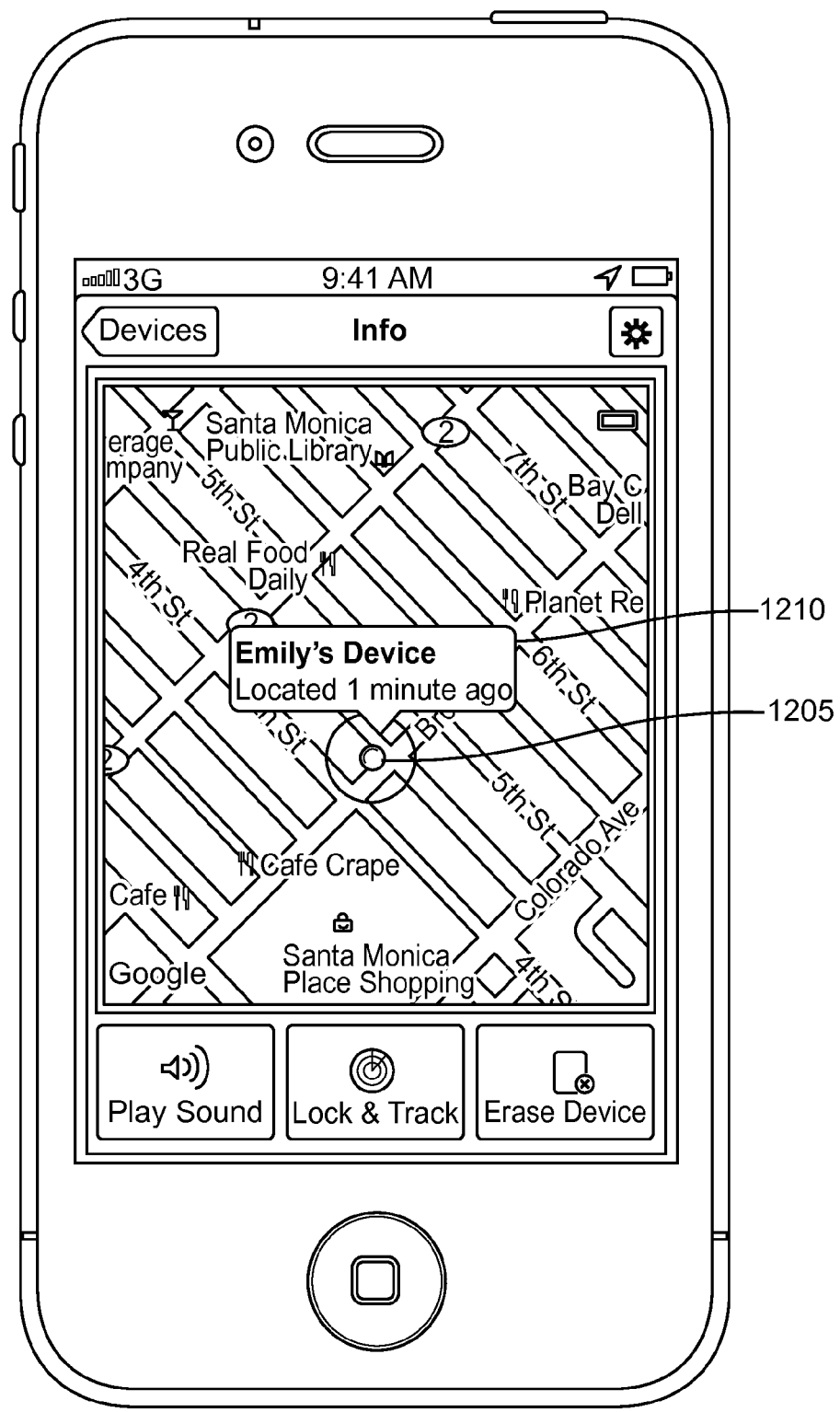
FIG. 12 illustrates a screenshot of an exemplary embodiment of location data being presented.

FIG. 12 illustrates a screenshot of an exemplary embodiment of location data being presented. As illustrated, the location data 1205 can be presented as a dot over a map to illustrate the location of the device. Further, an info box 1210 can be presented with the dot that displays the time the location data was collected. As illustrated, the lost device was determined to be at the identified location one minute prior to the location data being presented. In some embodiments, the info box 1210 can display other information such as the remaining battery life of the lost device at the time the lost device was at the location.

Figure 13:
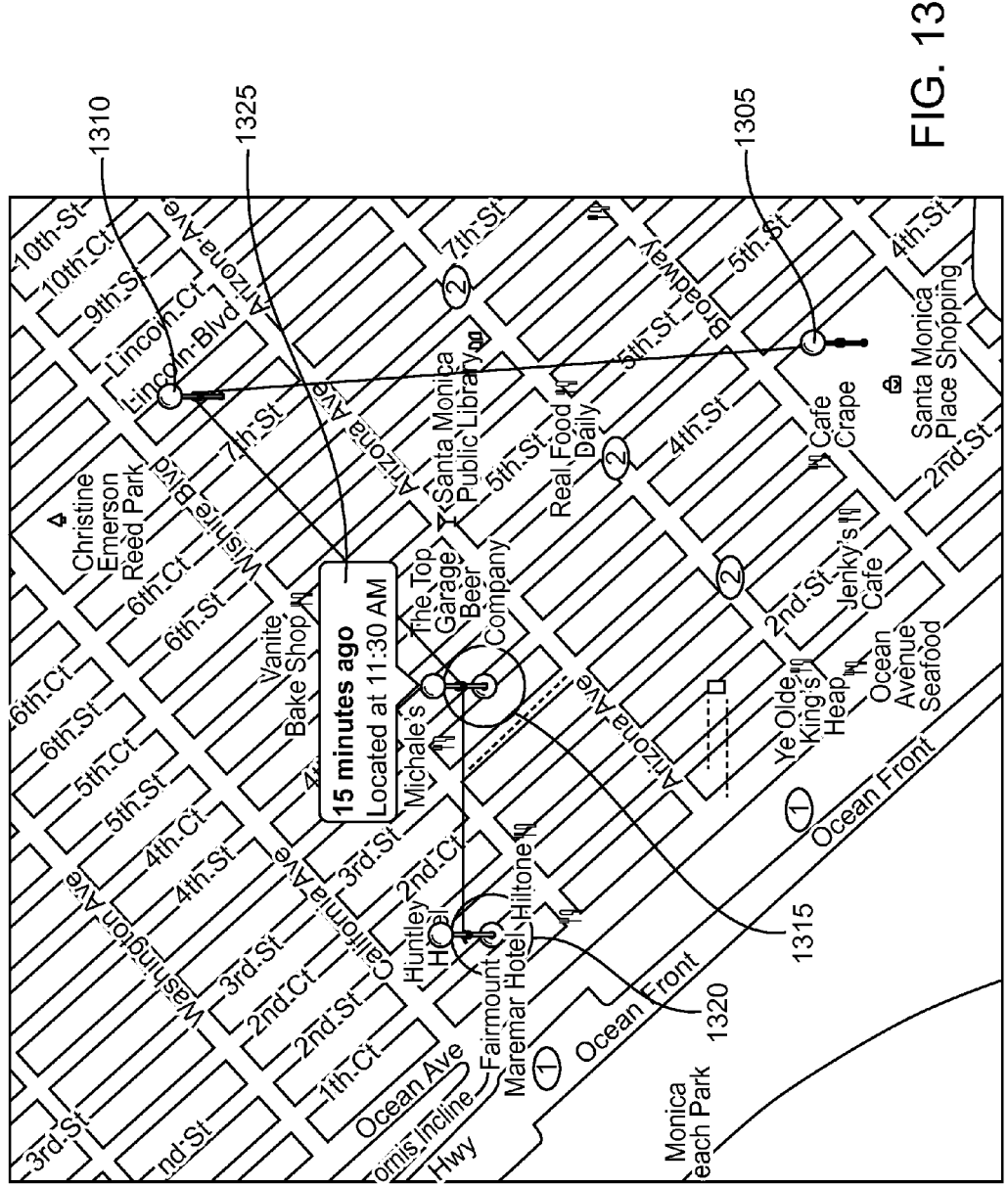
FIG. 13 illustrates a screenshot of an exemplary embodiment of location data being presented.

FIG. 13 illustrates a screenshot of an exemplary embodiment of location data being presented. As illustrated multiple location data points 1305 1310 1315 1320 can be displayed as dots on a map to illustrate the movement of the lost device. The location data points can be connected by a line to display the path of the lost device and the dots can be different colors to signify which location data point is the most recent. For example, all previous location data points can be illustrated in one color, such as green, while the most current data location point can be illustrate in a different color, such as red. Further, each location data point can be configured to display an information box 1325 associated with the location data point that identifies the time at which the device was at the given location data point. As illustrated, the lost device was at location data point 1315 16 minutes prior at 11:30 am.

In some embodiments, the presentation of multiple location data points can be concatenated or merged based upon the perspective at which the map is presented. For example, if the lost device travels a long distance, such as from San Francisco, Calif. to New York, N.Y., all location data points presented in San Francisco can be presented as one point when viewing a map displaying the entire path of the lost device. This can result in the path of the lost device being displayed in a simpler form expressing only the major movements of the lost device and removing confusing clutter of having multiple location data points displayed closely together.

If multiple location data points are merged into one location data point the time associated with the merged one location data point can be the latest recorded time the lost device was at any of the merged location data points that have been merged into the one location data point. For example, if the lost device was last determined to be in San Francisco at 4pm before leaving to New York, the one location data point representing the merged data points from the lost device being in San Francisco can be associated with the time 4pm because it is the last time associated with any of the merged location data points from the lost device being in San Francisco. Alternatively, the time associated with the one merged location data point can be represented as the span of time starting with the earliest time associated with one of the merged location data points through the latest time associated with one of the merged location data points. For example, if the earliest location data point merged into the one location data point representing that the lost device was in San Francisco occurred at 11am, the time 11am-4pm can be associated with the one location data point representing the lost device being in San Francisco.

The merged location data points can be unmerged and displayed as individual location data points for a more accurate view of the path of the lost device upon the requesting user zooming into the area of the map where the location data points have been merged. Thus, if the requesting user zoomed in to the map view of San Francisco, all the merged data points received from 11am-4pm can be presented separately so that the requesting user can view the path the lost device traveled during that period of time.

Figure 14:
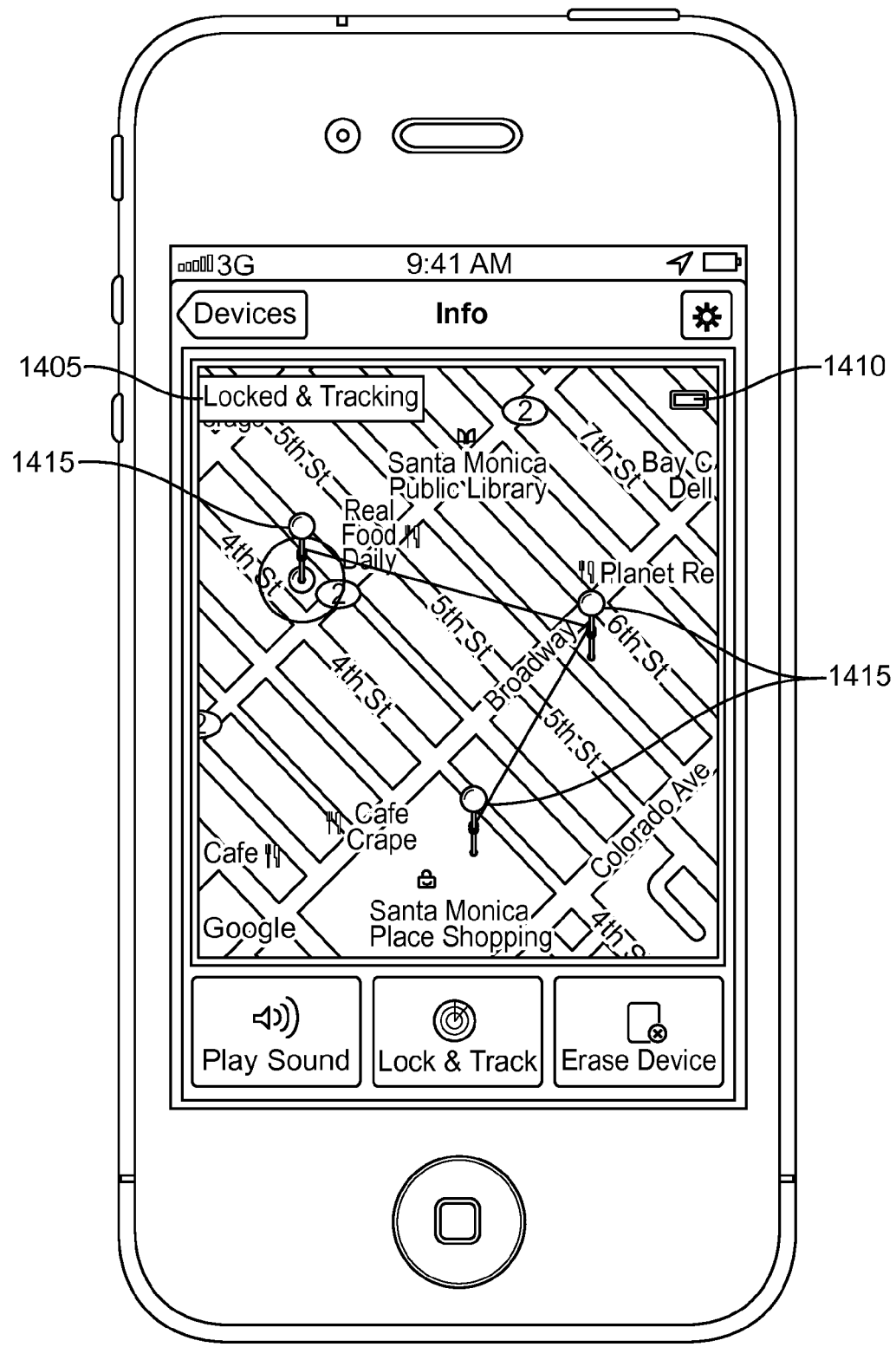
FIG. 14 illustrates an exemplary embodiment of location data being presented to the requesting user.

FIG. 14 illustrates an exemplary embodiment of location data being presented to the requesting user. As illustrated, three location data points 1415 are presented on a map interface and connected by lines to illustrate the path of the lost device. In addition to the location data points, the interface can also display other status data regarding the lost device. For example, as illustrated, status data that the lost device is locked and the locations are being tracked 1405 is presented to the requesting user. Further, the remaining battery life of the lost device can be presented as an icon 1410 of a battery. In some embodiments, the remaining battery life can be presented as an amount of remaining time until the lost device runs out of battery power. As illustrated the lost device currently has full battery power.

Figure 15:
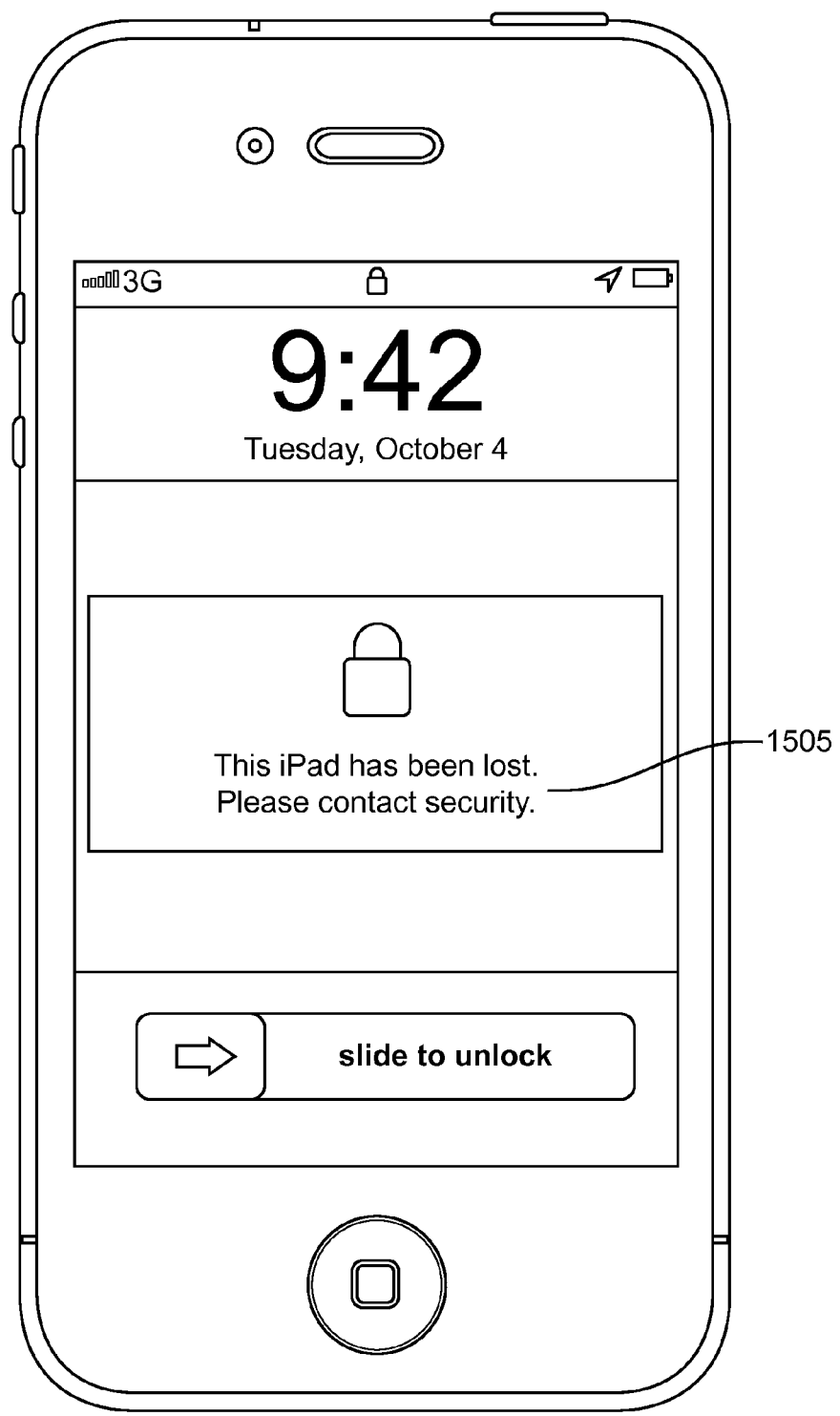
FIG. 15 illustrates a screenshot of an exemplary embodiment of lost mode wherein only a message is presented.

FIG. 15 illustrates a screenshot of an exemplary embodiment of lost mode wherein only a message is presented. As illustrated, a message 1505 is presented to the requesting user; however contact information is not presented. This can be because the requesting user did not include contact information or chose to have only the message displayed.

Figure 16:
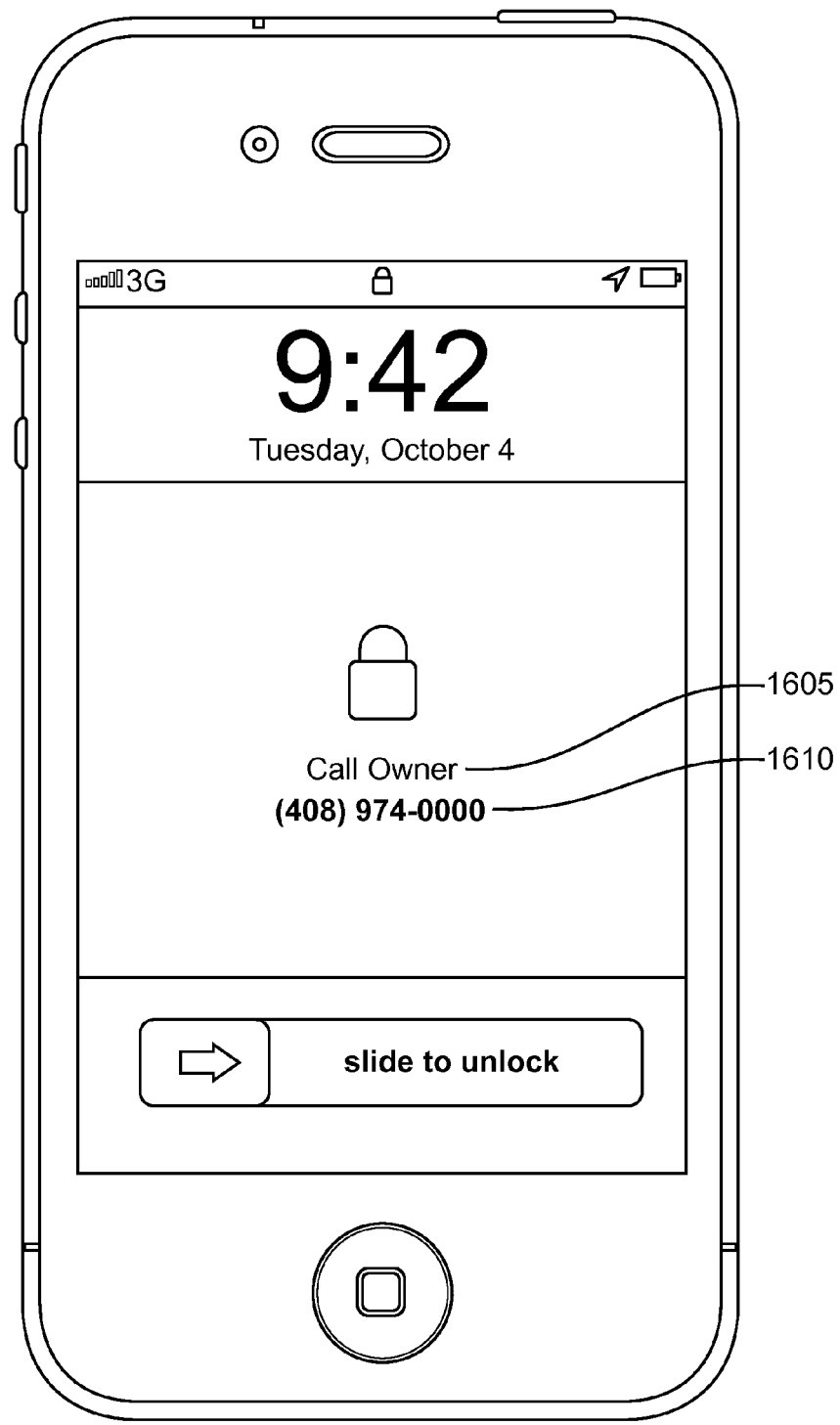
FIG. 16 illustrates a screenshot of an exemplary embodiment of lost mode wherein the requesting user did not provide a message.

FIG. 16 illustrates a screenshot of an exemplary embodiment of lost mode wherein the requesting user did not provide a message. As illustrated the provided contact information 1610 is displayed as well as a default message 1605. In some embodiments, no message can be included rather than a default message.

Figure 17:
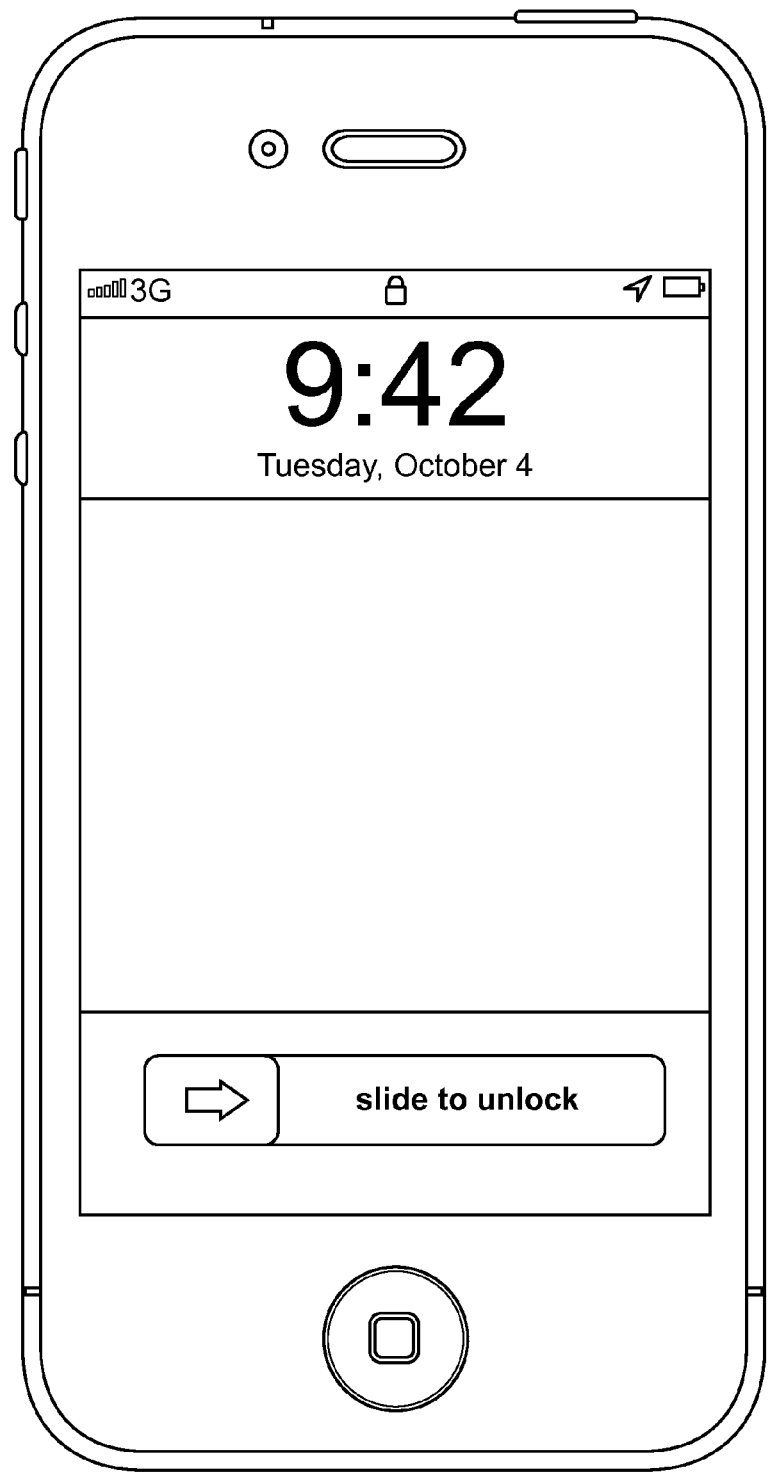
FIG. 17 illustrates a screenshot of an exemplary embodiment of a lost device that is locked using a silent lock.

FIG. 17 illustrates a screenshot of an exemplary embodiment of a lost device that is locked using a silent lock. As illustrated, no message, contact information, or any other indication that lost mode has been initiated is displayed on the lost device. In some embodiments, the lost device can be configured to be unresponsive to input, thus appearing as if the lost device is malfunctioning rather than in lost mode. In some embodiments, initiating a silent lock locks the lost device so that a password is required, although the lost device was not configured to require a password prior to lost mode being initiated. The lost device thus can appear to have always required the password to be unlocked rather than having been remotely placed into lost mode.

Figure 18:
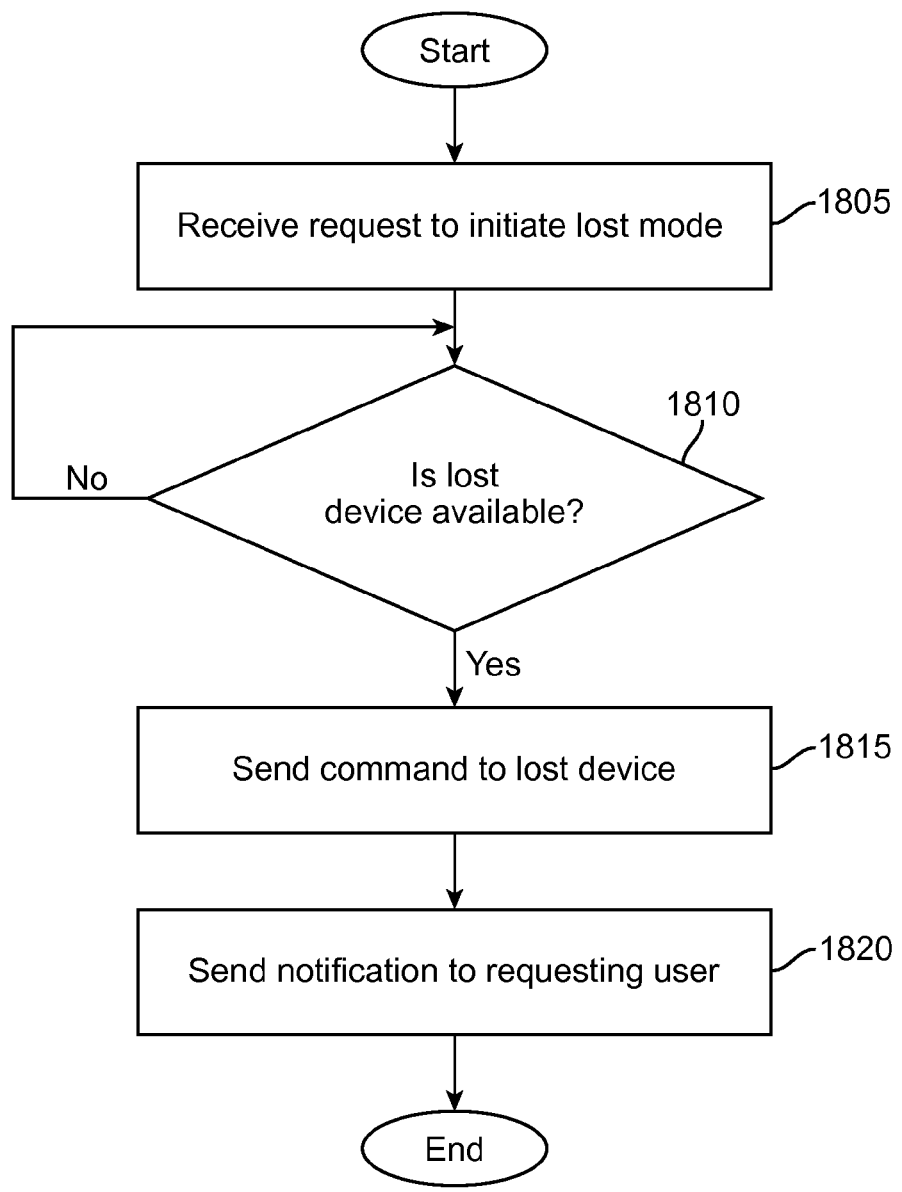
FIG. 18 illustrates an exemplary embodiment of a method of initiating lost mode on a lost device that is not available.

FIG. 18 illustrates an exemplary embodiment of a method of initiating lost mode on a lost device that isn't available. As illustrated, the method begins with a request to initiate lost mode on the lost device being received at the server 1805. The method next determines whether the lost device is available 1810 to receive a communication from the server. For example, the server can ping the lost device to determine whether the lost device is currently in network communication with the server. In some embodiments, the server can regularly receive status data from the lost device indicating that the lost device is currently connected to a network and in network connection with the server, and based on whether the status data has been received; determine whether the lost device is available.

If it is determined the lost device is not available, the method continues to check whether the lost device is available. For example, the server can be configured to check the status of the lost device at regular time intervals. In some embodiments, the server can be configured to recheck the status of the lost device until it is determined that the lost device is available. In some embodiments, the server can recheck whether the lost device is available until a predetermined time limit has expired upon which a failure notification is sent to the requesting user and the method ends.

If it is determined that the lost device is available, the server can send a command to the lost device 1815 to initiate lost mode on the lost device, preferably after authenticating the requesting user. The method next sends a notification to the requesting user 1820 that the lost device is available and that lost mode has been initiated on the lost device. In some embodiments, the notification can be sent by the server. In some embodiments, the notification can be sent by the lost device.

Figure 19:
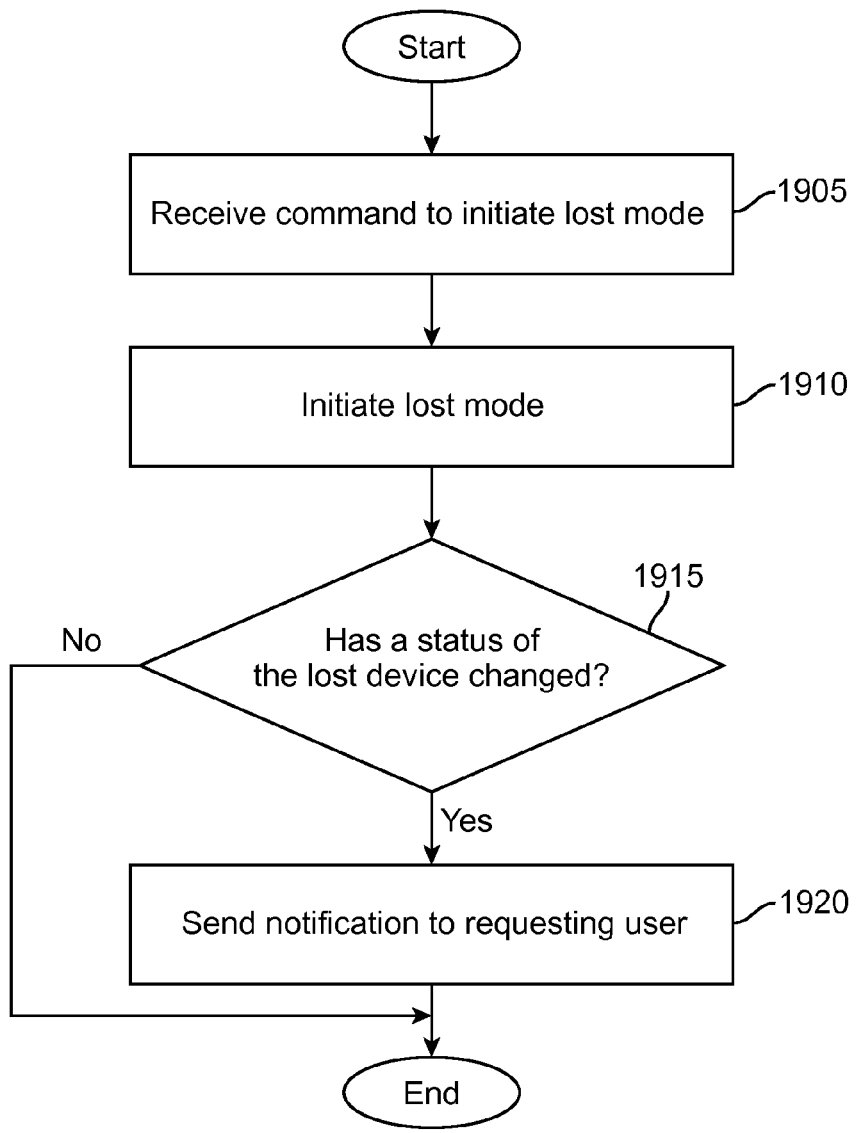
FIG. 19 illustrates an exemplary method embodiment of determining that a lost device has been found by another person.

FIG. 19 illustrates an exemplary method embodiment of determining that a lost device has been found by another person. As illustrated, the method begins at block 1905 when a command to initiate lost mode is received at the lost device. Upon receiving the command the lost device initiates lost mode on the lost device.

At block 1915 the lost device determines whether a status change indicating that the lost device has been found by another person occurred. For example, a lost device might be lost when lost mode is initiated, meaning that it is not in any person's possession but rather laying hidden or unfound. Upon lost mode being initiated, the lost device can begin to monitor for any indications that the lost device is in the possession of another person. For example, a determination that the location of the device has changed can be an indication that the lost device has been found by another person. Another indication that a status of the lost device has changed can be a button or feature of the lost device being pressed or activated. In some embodiments, a lost device can include a tilt sensor and the status can change can be the tilt of the lost device changing.

If a status change has been detected that indicates that the lost device has been found by another person, the lost device can send a notification to the requesting user 1920 that the lost device has been found.

Figure 20:
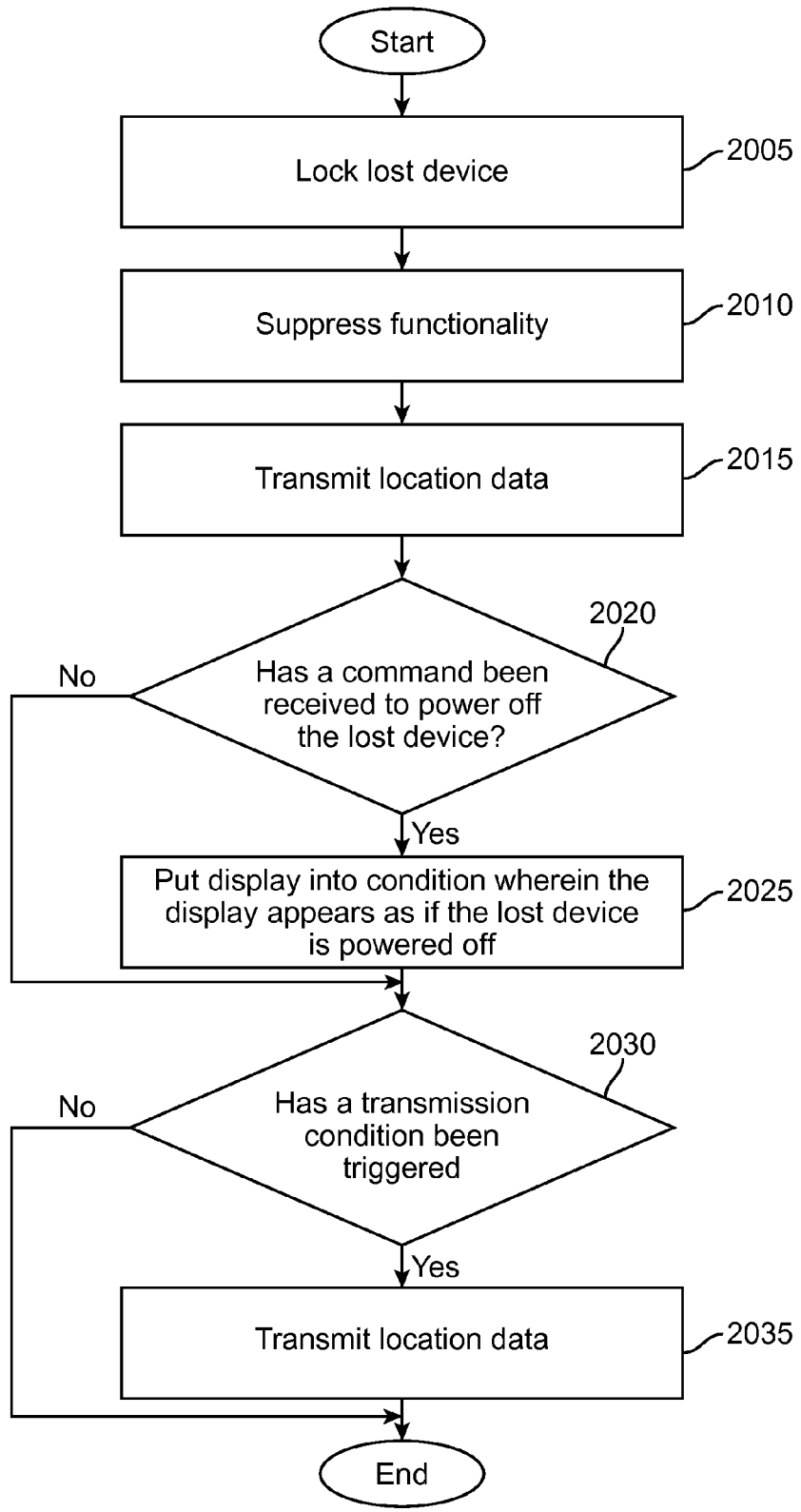
FIG. 20 illustrates an exemplary method embodiment of initiating lost mode wherein the functionality to power off the lost device is suppressed.

FIG. 20 illustrates an exemplary method embodiment of initiating lost mode wherein the functionality to power off the lost device is suppressed. As illustrated, the method begins with the lost device being locked 2005. The method next suppresses functionality of the lost device 2010 including the ability of the lost device to be manually powered off. This can include suppressing any way the device can selectively be powered off such as suppressing a power button on the lost device.

The method next transmits location data 2015 to the requesting user. The location data can be any data indicating the location of the lost device.

The method next determines whether an input is received to manually power off the lost device manually 2020. For example, a potential thief aware that lost mode has been initiated on the lost device can attempt to power off the lost device in order to prevent the lost device from transmitting additional location data. Although this functionality is suppressed, a potential thief aware that location data is still being transmitted from the lost device can take further steps to avoid being caught. For example, the potential thief may physically disable the device by opening the device or breaking the device. Alternatively, the potential thief may travel a far distance or to an area that the thief knows to be without network connection.

To avoid a potential thief taking such actions, upon receiving an input to power off the lost device, the lost device visually "powers off" 2025. This can include putting a display of the lost device into a condition wherein the display appears as if the lost device has been powered off. This can include replicating the visual interface and display that would be presented when the lost device is normally powered off and results in the lost device appearing to be powered off. This can include suppressing other functionality of the lost device such as disabling buttons to replicate the responsiveness of the lost device when powered off. Although appearing to be powered off, other functionality of the lost device such as sending and receiving data transmissions, continue to be performed without any visual or audible indications.

For example, a potential thief can push a power button on the lost device and the lost device can be configured to visually execute exactly as it would if lost mode was not initiated. This can include presenting a graphical display or video as well as turning off any lights on the lost device. The lost device would react no differently than when lost mode is not initiated on the lost device and it is manually powered off. Visually "powering off" the lost device results in the lost device appearing and reacting exactly as if it would if it was actually powered off, although the lost device remains powered on and remains capable of performing certain functionality such as transmitting location data to the requesting user.

Accordingly, at block 2030, the lost device determines whether a transmission trigger has been triggered and, if so, transmits location data to the requesting user 2035, while the lost device appears to be powered off to the potential thief.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method, comprising:
authenticating a requesting user operating a requesting computing device to initiate a lost mode on a computing device, where the authenticating is performed over a communications network coupled to the requesting computing device and the computing device;
sending a first command over the communications network to the computing device to initiate the lost mode on the computing device, where the lost mode includes locking the computing device or suppressing select functionality of the computing device;
receiving, over the communications network, status data from the computing device, wherein the status data indicates at least a remaining battery life associated with the computing device;
presenting the status data of the computing device on the requesting computing device, wherein the status data includes an estimated amount of remaining time until the computing device runs out of battery life; and
sending a second command to the computing device to send status data less frequently based on the status data indicating the remaining battery life of the computing device.

2. The method of claim 1, wherein the status data includes location data identifying the location of the computing device and is associated with a time indicating when the status data was gathered from the computing device.

3. The method of claim 1, wherein the status data is transmitted upon the remaining battery life associated with the computing device reaching a predetermined milestone.

4. The method of claim 3, wherein the milestone is the remaining battery life reaching a predetermined percentage of total battery life.

5. The method of claim 3, wherein the milestone is the remaining battery life reaching a predetermined amount of remaining time left until the computing device runs out of battery life.

6. A system, comprising:
one or more processors; and
memory containing instructions that, when executed by the one or more processors, causes the one or more processors to perform operations comprising:
authenticating a requesting user operating a requesting computing device to initiate a lost mode on a computing device, where the authenticating is performed over a communications network coupled to the requesting computing device and the computing device;
sending a first command over the communications network to the computing device to initiate the lost mode on the computing device, where the lost mode includes locking the computing device or suppressing select functionality of the computing device;
receiving, over the communications network, status data from the computing device, wherein the status data indicates at least a remaining battery life associated with the computing device;
presenting the status data of the computing device on the requesting computing device, wherein the status data includes an estimated amount of remaining time until the computing device runs out of battery life; and
sending a second command to the computing device to send status data less frequently based on the status data indicating the remaining battery life of the computing device.

7. The system of claim 6, wherein the status data includes location data identifying the location of the computing device and is associated with a time indicating when the status data was gathered from the computing device.

8. The system of claim 6, wherein the status data is transmitted upon the remaining battery life associated with the computing device reaching a predetermined milestone.

9. The system of claim 8, wherein the milestone is the remaining battery life reaching a predetermined percentage of total battery life.

10. The system of claim 8, wherein the milestone is the remaining battery life reaching a predetermined amount of remaining time left until the computing device runs out of battery life.

11. A method comprising:
receiving, by a computing device, a first command over a communications network to initiate a lost mode on the computing device;
locking the computing device or suppressing select functionality of the computing device;

determining a remaining battery life of the computing device; and sending, over the communications network, status data indicating at least a remaining battery life of the computing device, wherein the status data includes an estimated amount of remaining time until the computing device runs out of battery life; and receiving, by the computing device, a second command over the communications network to send status data less frequently based on the status data indicating the remaining battery life of the computing device.

12. The method of claim 11, wherein the status data includes location data identifying the location of the computing device and is associated with a time indicating when the status data was gathered from the computing device.

13. The method of claim 11, wherein the status data is transmitted upon the remaining battery life associated with the computing device reaching a predetermined milestone.

14. The method of claim 13, wherein the milestone is the remaining battery life reaching a predetermined percentage of total battery life.

15. The method of claim 13, wherein the milestone is the remaining battery life reaching a predetermined amount of remaining time left until the computing device runs out of battery life.

16. A computing device comprising:
one or more processors; and
memory containing instructions that, when executed by the one or more processors, cause the one or more processors to perform operations comprising:
receiving, by the computing device, a first command over a communications network to initiate a lost mode on the computing device;

locking the computing device or suppressing select functionality of the computing device;

determining a remaining battery life of the computing device;

sending, over the communications network, status data indicating at least a remaining battery life of the computing device, wherein the status data indicating a remaining battery life associated with the computing device includes an estimated amount of remaining time until the computing device runs out of battery life;

receiving, by the computing device, a second command to send status data less frequently based on the status data indicating the remaining battery life of the computing device.

17. The computing device of claim 16, wherein the status data includes location data identifying the location of the computing device and is associated with a time indicating when the status data was gathered from the computing device.

18. The computing device of claim 16, wherein the status data is transmitted upon the remaining battery life associated with the computing device reaching a predetermined milestone.

19. The computing device of claim 18, wherein the milestone is the remaining battery life reaching a predetermined percentage of total battery life.

20. The computing device of claim 18, wherein the milestone is the remaining battery life reaching a predetermined amount of remaining time left until the computing device runs out of battery life.

* * * * *